(12) United States Patent
Deitz et al.

(10) Patent No.: US 6,670,457 B2
(45) Date of Patent: Dec. 30, 2003

(54) REACTIVE DYES, THEIR PREPARATION AND USE

(75) Inventors: Rolf Deitz, Kandern (DE); Bernhard Müller, Efringen-Kirchen (DE); Athanassios Tzikas, Pratteln (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/222,309

(22) Filed: Aug. 16, 2002

(65) Prior Publication Data

US 2003/0055230 A1 Mar. 20, 2003

Related U.S. Application Data

(63) Continuation of application No. 08/715,055, filed on Sep. 17, 1996, now abandoned.

(30) Foreign Application Priority Data

Sep. 21, 1995 (CH) ................................................ 2675/95

(51) Int. Cl.⁷ .......................... C09B 62/33; C09B 62/24; C07C 245/02
(52) U.S. Cl. ....................... 534/637; 534/573; 534/617; 534/630; 534/632
(58) Field of Search ................ 534/637, 573, 534/617, 630, 632

(56) References Cited

U.S. PATENT DOCUMENTS 4,806,127 A    2/1989   Schlafer et al. ............. 534/617
5,484,899 A    1/1996   Deitz et al. ................. 534/618
5,542,956 A  * 8/1996   McMullan et al. ............ 8/641
5,548,071 A    8/1996   Deitz et al. ................. 534/617
5,631,352 A  * 5/1997   Lauk ......................... 534/797

FOREIGN PATENT DOCUMENTS

EP   0258806   3/1988
EP   0623655   11/1994
EP   0626429   11/1994
GB   1366097   9/1974
GB   1454210   11/1976
GB   2007698   5/1979

* cited by examiner

Primary Examiner—Barbara P. Badio
(74) Attorney, Agent, or Firm—Kevin T. Mansfield

(57) ABSTRACT

Compounds of the formula

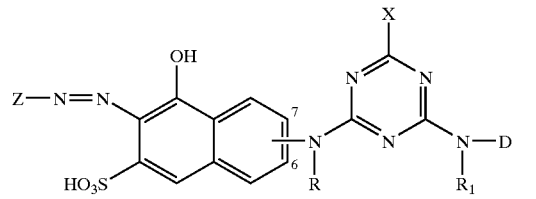

(1), in which the variables are as defined in the claims, which are suitable as fiber-reactive dyes for dyeing widely varying fiber materials, are described.

5 Claims, No Drawings

REACTIVE DYES, THEIR PREPARATION AND USE

This is a continuation of application Ser. No. 08/715,055, filed on Sep. 17, 1996 now abandoned.

The present invention relates to novel reactive dyes, processes for their preparation and their use for dyeing or printing textile fibre materials.

The practice of dyeing using reactive dyes has recently led to increased requirements regarding the quality of the dyeings and the economics of the dyeing process. Consequently, there continues to be a need for novel reactive dyes which have improved properties, in particular in respect of application.

Reactive dyes which have an adequate substantivity and at the same time a good ease of washing off of the non-fixed portions are now required for dyeing. They should furthermore show a good dyeing yield and have a high reactivity, and, in particular, dyeings with high degrees of fixing should be produced. The known dyes do not meet these requirements in all properties.

The present invention is therefore based on the object of discovering novel, improved reactive dyes for dyeing and printing fibre materials which have the qualities described above to a high degree. The novel dyes should be distinguished, in particular, by high fixing yields and high fibre-dye bond stabilities, and furthermore the portions not fixed on the fibre should be easy to wash off. They should furthermore produce dyeings with good allround properties, for example light and wet fastness properties.

It has been found that the set object can be largely achieved with the novel reactive dyes defined below.

The present invention relates to compounds of the formula

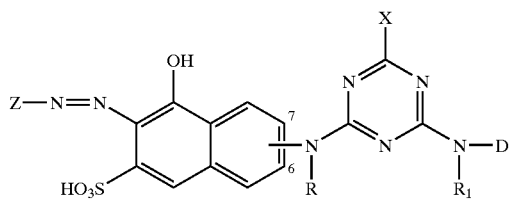

(1), in which Z is the radical of a diazo component,
R is substituted or unsubstituted $C_1$–$C_4$alkyl,
$R_1$ is hydrogen or substituted or unsubstituted $C_1$–$C_4$alkyl,
X is halogen, 3-carboxypyridin-1-yl or 3-carbamoylpyridin-1-yl and
D is the radical of a monoazo, polyazo, metal complex azo, anthraquinone, phthalocyanine, formazan or dioxazine chromophore,
with the provisos that (i) at least one of the radicals D and Z carries a fibre-reactive radical —$SO_2$—Y or —NHCO—$Y_1$, in which
Y is vinyl or a radical —$CH_2$—$CH_2$—U,
U is a leaving group,
$Y_1$ is a group —$CHX_1$—$CH_2X_1$ or —$CX_1$=$CH_2$ and
$X_1$ is bromine or chlorine,
and that (ii) the radical —$NR_1$— is not bonded to a phenylene radical substituted by —$NH_2$ if D is the radical of a monoazo or disazo chromophore.

The radical —NR— can be bonded to the hydroxynaphthalenesulfonic acid radical in the 7-position or, preferably, in the 6-position.

Substituted or unsubstituted $C_1$–$C_4$alkyl R or $R_1$ can be, for example, methyl, ethyl, n- or iso-propyl or n-, sec-, tert- or iso-butyl which are unsubstituted or substituted, for example by hydroxyl, sulfo, sulfato, carboxyl, cyano, halogen, $C_1$–$C_4$alkoxycarbonyl or carbamoyl.

R is preferably unsubstituted $C_1$–$C_4$alkyl, particularly preferably methyl or ethyl, and especially preferably methyl.

$R_1$ is preferably hydrogen or $C_1$–$C_4$alkyl which is unsubstituted or substituted by hydroxyl, particularly preferably hydrogen, methyl or ethyl, and especially preferably hydrogen.

X is preferably halogen, for example fluorine, chlorine or bromine, and particularly preferably fluorine or chlorine.

Z is, for example, the radical of an aminobenzene, aminonaphthalene, phenylazoaminobenzene or phenylazoaminonaphthalene, which can be further substituted by substituents customary in dyes.

Suitable substituents on the radical Z are, for example, sulfo; $C_1$–$C_4$alkyl, in particular methyl; hydroxyl; $C_1$–$C_4$alkoxy, in particular methoxy; $C_1$–$C_4$alkoxy which is substituted by hydroxyl, methoxy, ethoxy or sulfato, for example β-hydroxyethoxy, β-sulfatoethoxy or β-methoxyethoxy; halogen, in particular chlorine; $C_2$–$C_4$alkanoylamino, for example acetylamino or propionylamino; ureido; or a fibre-reactive radical of the formula

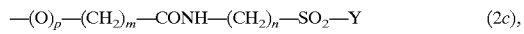

or

in which Y and $Y_1$ are each as defined above,
X' is independently as defined and preferred above for X,
T is a non-reactive amino radical,
p is the number 0 or 1 and
m and n independently of one another are each an integer from 1 to 6.

In a radical —$CH_2$—$CH_2$—U Y, the leaving group U can be, for example, —Cl, —Br, —F, —$OSO_3H$, —$SSO_3H$, —OCO—$CH_3$, $OPO_3H_2$, —OCO—$C_6H_5$, $OSO_2$—$C_1$–$C_4$alkyl or —$OSO_2$—$N(C_1$–$C_4$alkyl$)_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Y is preferably vinyl, β-chloroethyl, β-sulfatoethyl, β-thiosulfatoethyl, β-acetoxyethyl, β-phenoxyethyl or β-phosphatoethyl, and particularly preferably β-sulfatoethyl or vinyl.

$Y_1$ is a group —$CHX_1$—$CH_2X_1$ or —$CX_1$=$CH_2$, in which $X_1$ is chlorine or, preferably, bromine.

n is preferably the number 2, 3 or 4, particularly preferably the number 2 or 3, and especially preferably the number 2. m is preferably the number 1, 2 or 3, and particularly preferably the number 1 or 2. p is preferably the number 0.

A non-reactive amino radical T can be, for example, amino; N—$C_1$–$C_4$alkylamino or N,N-di-$C_1$–$C_4$alkylamino, in which the alkyl can in each case be substituted, for example by sulfo, sulfato, hydroxyl, carboxyl or phenyl; cyclohexylamino; phenylamino or naphthylamino, in which the phenyl or naphthyl can in each case be substituted, for example by $C_1$–$C_4$alkyl, $C_1$–$C_4$alkoxy, amino, $C_2$–$C_4$alkanoylamino, carboxyl, sulfo or halogen; N–$C_1$–$C_4$alkyl-N-phenylamino, in which the alkyl and phenyl can optionally be substituted as described above, or morpholino.

Examples of suitable non-reactive amino radicals T are amino, methylamino, ethylamino, β-hydroxyethylamino, N,N-di-β-hydroxyethylamino, β-sulfoethylamino, cyclohexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, β-hydroxyethyl-N-phenylamino and morpholino.

T is preferably amino, N-mono- or N,N-di-$C_1$–$C_2$-alkylamino, which is unsubstituted or substituted by hydroxyl, sulfo or sulfato, cyclohexylamino, phenylamino or naphthylamino, which are unsubstituted or substituted by methyl, methoxy, carboxyl or sulfo, N—$C_1$–$C_2$alkyl-N-phenylamino or morpholino and particularly preferably amino, N-mono- or N,N-di-$C_1$–$C_2$alkyl-amino which is unsubstituted or substituted by sulfo, phenylamino which is substituted by 1 to 3 identical radicals from the group consisting of methyl, methoxy and sulfo, or 1- or 2-naphthylamino which carries 1 to 3 sulfo groups.

Examples of preferred radicals Z are:

(a) phenyl which is substituted by one or more identical or different substituents from the group consisting of sulfo, $C_1$–$C_4$alkyl, $C_1$–$C_4$alkoxy and reactive radicals of the formulae (2a), (2b) or (2d) defined above;

(b) 1- or 2-naphthyl which is substituted by sulfo or a reactive radical of the formula (2a) defined above;

(c) a radical of the formula

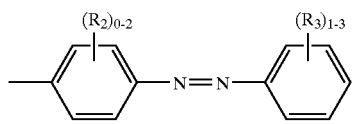

(3), in which $(R_2)_{0-2}$ is 0 to 2 identical or different radicals $R_2$ from the group consisting of sulfo; methyl, methoxy, β-hydroxyethoxy, β-sulfatoethoxy, β-methoxyethoxy, acetylamino and ureido and $(R_3)_{0-3}$ is 0 to 3 identical or different radicals from the group consisting of sulfo, methyl and methoxy; and (d) a radical of the formula

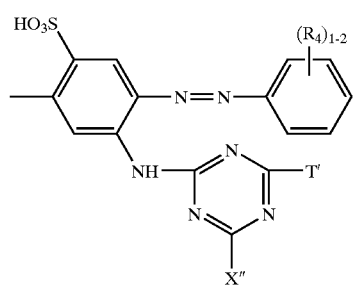

(4), in which T' is independently as defined and preferred above for T, X" is independently as defined and preferred above for X, and $(R_4)_{1-2}$ is 1 or 2 identical or different radicals $R_4$ from the group consisting of methyl, methoxy, sulfo and reactive radicals of the formulae (2a), (2b) and (2d) defined above.

Z is particularly preferably phenyl which is unsubstituted or substituted by sulfo, methyl, methoxy or a reactive radical of the formula (2a) defined above, 2-naphthyl which is substituted by 1 to 3 sulfo groups, or a radical of the formula

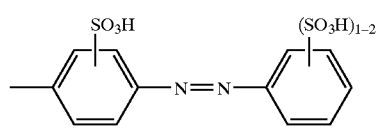

(3a).

Z is especially preferably a radical of the formula

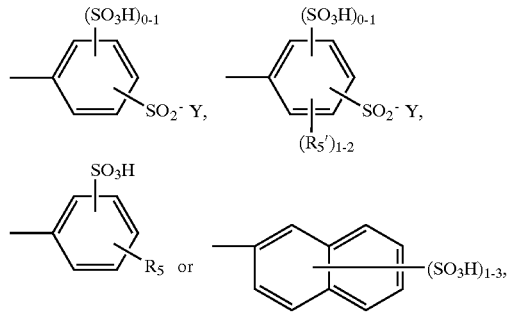

in which $R_5$ is hydrogen, methyl, methoxy or sulfo, $(R_5')_{1-2}$ is 1 or 2 identical or different substituents chosen from the group consisting of methyl and methoxy and Y is vinyl or β-sulfatoethyl.

D is preferably the radical of a monoazo, disazo, anthraquinone, formazan, phthalocyanine or dioxazine chromophore, and particularly preferably the radical of a monoazo, disazo or formazan chromophore.

Examples of suitable chromophore radicals D are:

(i)

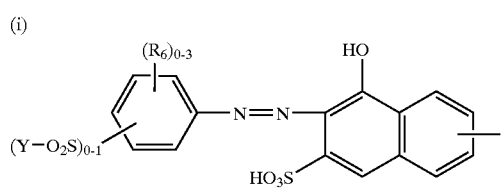

(5a), in which $(R_6)_{0-3}$ is 0 to 3 identical or different substituents from the group consisting of $C_1$–$C_4$alkyl, $C_1$–$C_4$alkoxy, halogen, carboxyl and sulfo and Y is as defined above;

(ii)

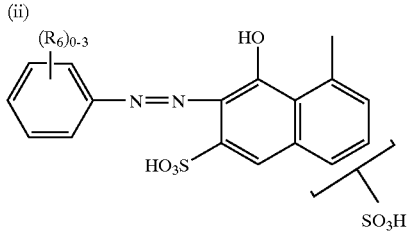
(5b)

in which $(R_6)_{0-3}$ is as defined above or is a radical of the formula —$SO_2$—Y, in which Y is as defined and preferred above;

(iii)

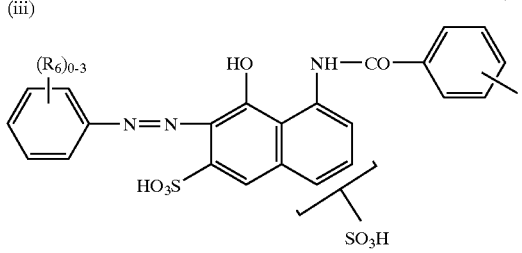
(5c), in which $(R_6)_{0-3}$ is as defined above, (iv)

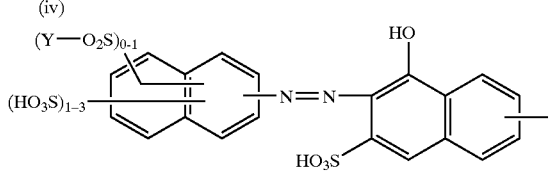
(5d), in which Y is as defined above;

(v)

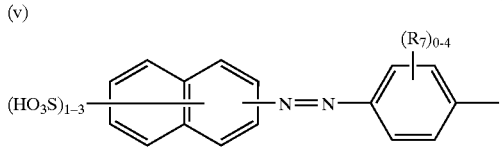
(5e), in which $(R_7)_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo;

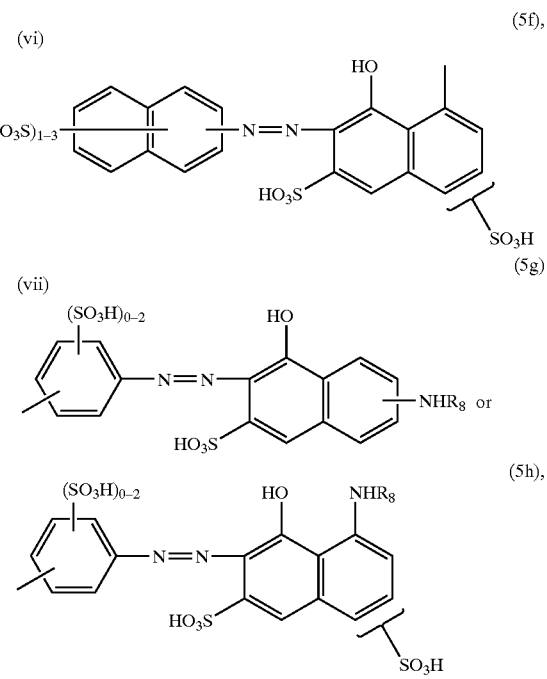

(5f), (vi)

(5g), (vii)

(5h), in which $R_8$ is $C_1$–$C_4$-alkanoyl or benzoyl, or in which —$NHR_8$ is a fibre-reactive halotriazinyl radical of the formula (2e) defined above;

(viii)

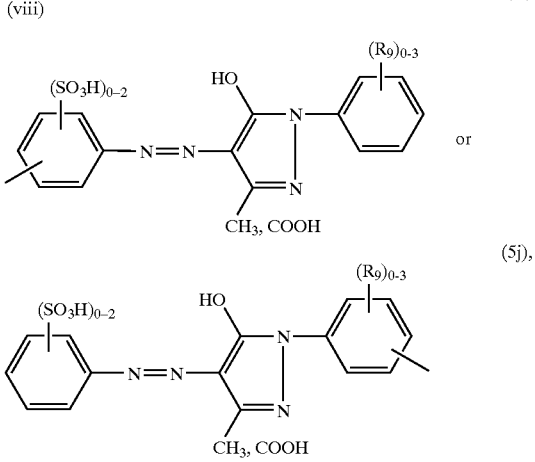

(5i)

or (5j), in which $(R_9)_{0-3}$ is 0 to 3 identical or different substituents from the group consisting of $C_1$–$C_4$alkyl, $C_1$–$C_4$alkoxy, halogen, carboxyl and sulfo;

(ix)

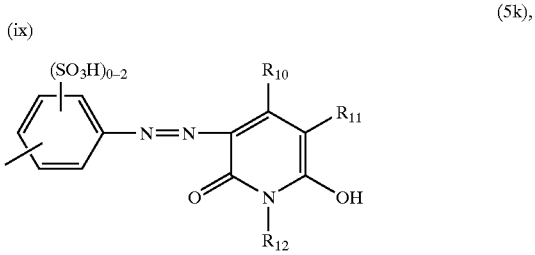
(5k), in which $R_{10}$ and $R_{12}$ independently of one another are hydrogen, $C_1$–$C_4$alkyl or phenyl and $R_{11}$ is hydrogen, cyano, carbamoyl or sulfomethyl;

(x)

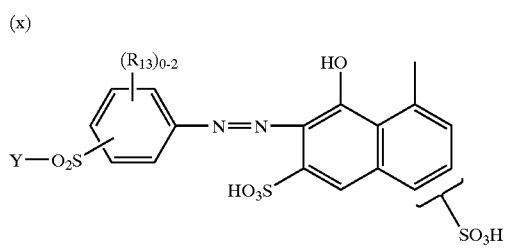

(5l),

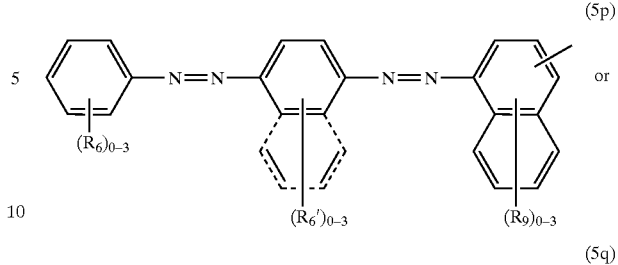

(5p)

in which $(R_{13})_{0-2}$ is 0 to 2 identical or different substituents from the group consisting of $C_1$–$C_4$alkyl, $C_1$–$C_4$alkoxy, halogen, carboxyl and sulfo; and Y is as defined above;

(xi)

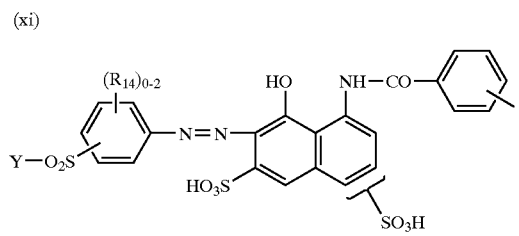

(5m), in which $(R_{14})_{0-2}$ is 0 to 2 identical or different substituents from the group consisting of $C_1$–$C_4$alkyl, $C_1$–$C_4$alkoxy, halogen, carboxyl and sulfo; and Y is as defined above;

(xii)

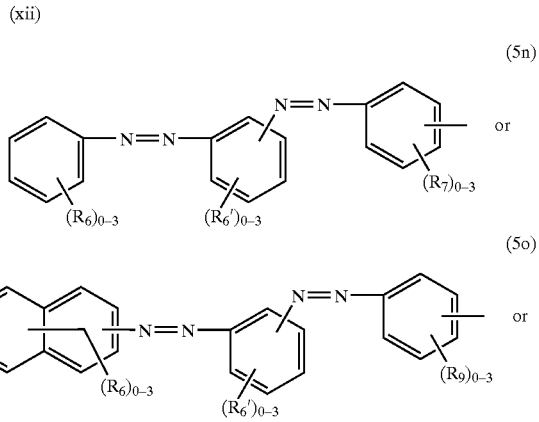

in which $(R_6)_{0-3}$, $(R_7)_{0-3}$ and $(R_9)_{0-3}$ are each as defined above and $(R_6')_{0-3}$ is 0 to 3 identical or different substituents from the group consisting of $C_1$–$C_4$alkyl, $C_1$–$C_4$alkoxy which is unsubstituted or substituted by hydroxyl, sulfato or $C_1$–$C_2$alkoxy, halogen, carboxyl and sulfo;

(xiii)

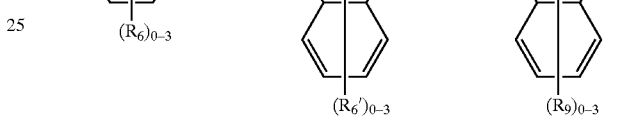

in which $(R_6)_{0-3}$ and $(R_6')_{0-3}$ are each as defined above;

(xiv)

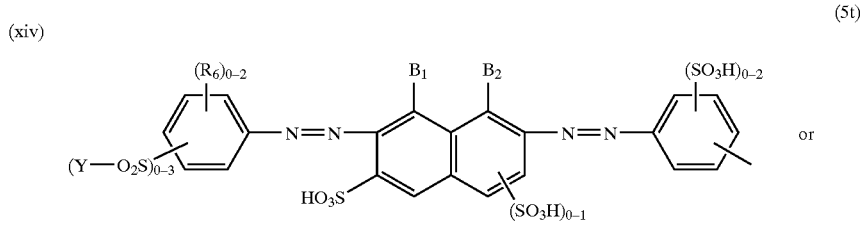

(5t)

-continued (5t') 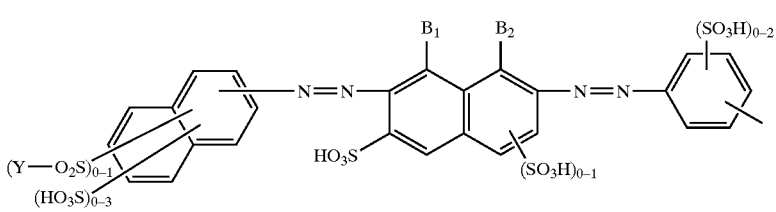

in which $(R_6)_{0-2}$ is 0 to 2 identical or different substituents from the group consisting of $C_1$–$C_4$alkyl, $C_1$–$C_4$alkoxy, halogen, carboxyl and sulfo, one of the variables $B_1$ and $B_2$ is hydroxyl and the other is amino and Y is as defined above;

(xv)

(5u) 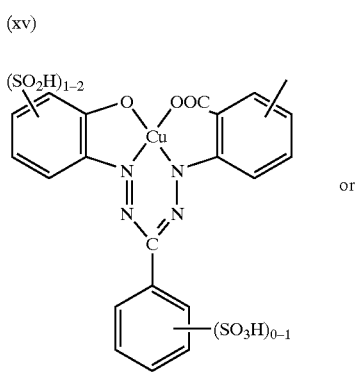

or (5v), 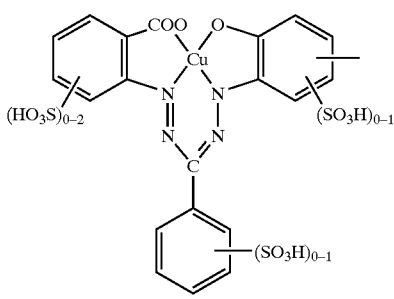

in which the benzene rings contain no further substituents or are further substituted by $C_1$–$C_4$alkyl, $C_1$–$C_4$alkoxy, $C_1$–$C_4$alkylsulfonyl, halogen or carboxyl;

(xvi)

(5w) 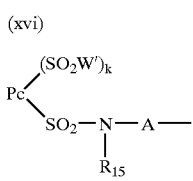

in which Pc is the radical of a metal phthalocyanine, in particular the radical of a copper or nickel phthalocyanine;

W' is —OH and/or —$NR_{16}R_{16}'$;

$R_{16}$ and $R_{16}'$ independently of one another are hydrogen or $C_1$–$C_4$alkyl which is unsubstituted or substituted by hydroxyl or sulfo;

$R_{15}$ is hydrogen or $C_1$–$C_4$alkyl;

A is a phenylene radical which is unsubstituted or substituted by $C_1$–$C_4$alkyl, halogen, carboxyl or sulfo, or a $C_2$–$C_6$alkylene radical; and k is 1 to 3;

(xvii)

(5x)

![structure 5x]

in which A' is a phenylene radical which is unsubstituted or substituted by $C_1$–$C_4$alkyl, halogen, carboxyl or sulfo, or a $C_2$–$C_6$alkylene radical, r, s, v and v' independently of one another are each the number 0 or 1 and Y is as defined above; and (xviii)

(5y)

![structure 5y]

in which G is a phenylene radical which is unsubstituted or substituted by $C_1$–$C_4$alkyl, $C_1$–$C_4$alkoxy, halogen, carboxyl or sulfo, or a cyclohexylene, phenylenemethylene or $C_2$–$C_6$ akylene radical.

D is especially preferably a radical of the formula (5b), (5e), (5f), (5k), (5t), (5t') or (5v) defined above.

A particularly preferred embodiment of the present invention relates to compounds of the formula (1) in which D is a radical of the formula (5b')

![structure 5b']

or (5f'),

![structure 5f']

in which $(R_6)_{0-2}$ is 0 to 2 identical or different substituents from the group consisting of methyl, methoxy, sulfo, —SO$_2$—CH=CH$_2$ and —SO$_2$—CH$_2$CH$_2$—OSO$_3$H, in particular methyl, methoxy and sulfo;

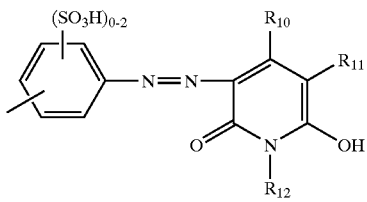

(5k), in which $R_{10}$ and $R_{12}$ independently of one another are each C$_1$–C$_4$alkyl and $R_{11}$ is cyano, carbamoyl or sulfomethyl;

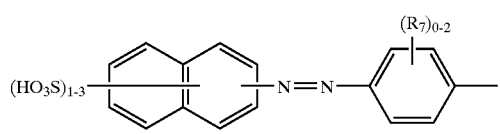

(5e'), in which $(R_7)_{0-2}$ is 0 to 2 identical or different substituents from the group consisting of C$_1$–C$_4$alkyl, C$_1$–C$_4$alkoxy, acetylamino, ureido and sulfo;

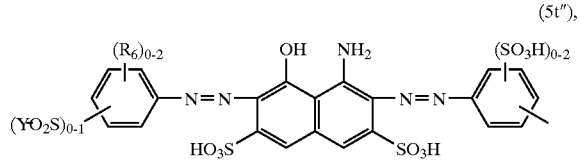

(5t''),

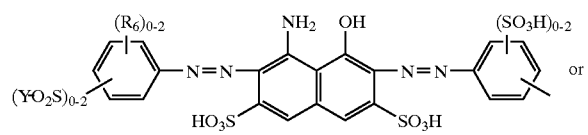

(5t'''), or

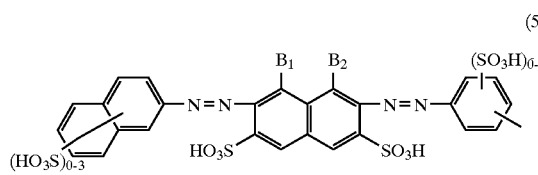

(5t*), in which $(R_6)_{0-2}$ is 0 to 2 identical or different substituents from the group consisting of methyl, methoxy and sulfo, one of the variables B$_1$ and B$_2$ is hydroxyl and the other is amino and Y is vinyl or β-sulfatoethyl or

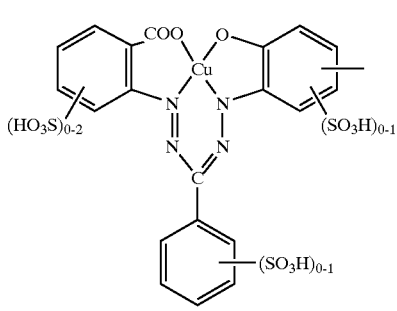

(5v).

The compounds of the formula (1) contain at least one, preferably at least two, and particularly preferably 2 to 8, sulfo groups, which are in each case either in the form of their free acid or, preferably, in the form of salts thereof. Salts are, for example, the alkali metal, alkaline earth metal or ammonium salts, salts of an organic amine or mixtures thereof. Examples are sodium, lithium, potassium or ammonium salts, the salt of mono-, di- or triethanolamine or Na/Li or Na/Li/NH$_4$ mixed salts.

A preferred embodiment of the present invention relates to compounds of the formula (1) defined above, in which
R is C$_1$–C$_4$alkyl;
R$_1$ is hydrogen, methyl or ethyl;
X is fluorine or chlorine;
Z is phenyl which is substituted by one or more identical or different substituents from the group consisting of sulfo, C$_1$–C$_4$alkyl, C$_1$–C$_4$alkoxy and reactive radicals of the formulae (2a), (2b) or (2d) defined above; 1- or 2-naphthyl which is substituted by sulfo or a reactive radical of the formula (2a) defined above; a radical of the formula

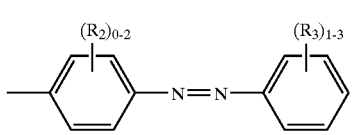

(3), in which $(R_2)_{0-2}$ is 0 to 2 identical or different radicals R$_2$ from the group consisting of sulfo; methyl, methoxy, β-hydroxyethoxy, β-sulfatoethoxy, β-methoxyethoxy, acetylamino and ureido and $(R_3)_{0-3}$ is 0 to 3 identical or different radicals from the group consisting of sulfo, methyl and methoxy; or a radical of the formula

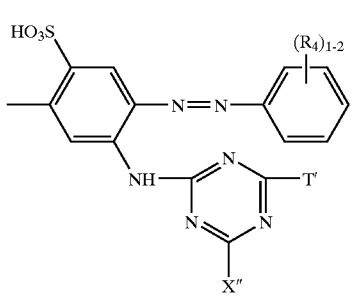

(4), in which T' is independently as defined and preferred above for T, X" is independently as defined and preferred above for X and $(R_4)_{1-2}$ is 1 or 2 identical or different radicals $R_4$ from the group consisting of methyl, methoxy, sulfo and reactive radicals of the formulae (2a), (2b) or (2d) defined above; and D is a radical of the formula (5b), (5e), (5f), (5k), (5t), (5t') or (5v) defined above.

A particularly preferred embodiment of the present invention relates to compounds of the formula (1) defined above in which R is methyl;

$R_1$ is hydrogen;

X is fluorine or chlorine;

Z is phenyl which is unsubstituted or substituted by sulfo, methyl, methoxy or a reactive radical of the formula (2a) defined above, 2-naphthyl which is substituted by 1 to 3 sulfo groups, or a radical of the formula

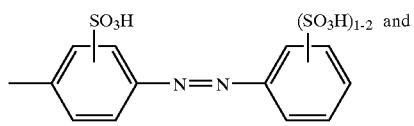
(3a);

D is a radical of the formula

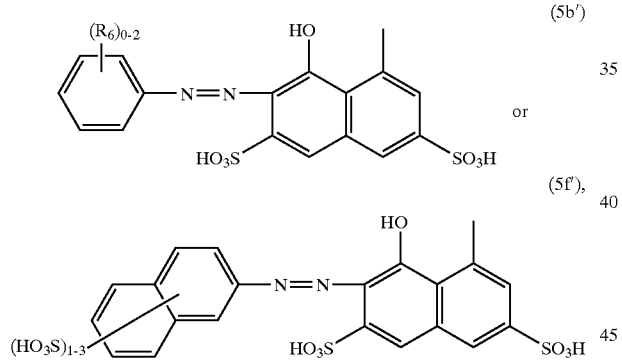

in which $(R_6)_{0-2}$ is 0 to 2 identical or different substituents from the group consisting of methyl, methoxy, sulfo, $-SO_2-CH=CH_2$ and $-SO_2-CH_2CH_2-OSO_3H$, in particular methyl, methoxy and sulfo;

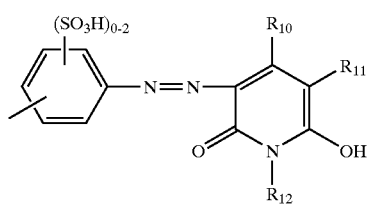
(5k), in which $R_{10}$ and $R_{12}$ independently of one another are each $C_1-C_4$alkyl and $R_{11}$ is cyano, carbamoyl or sulfomethyl;

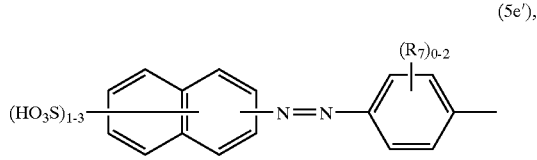
(5e'), in which $(R_7)_{0-2}$ is 0 to 2 identical or different substituents from the group consisting of $C_1-C_4$alkyl, $C_1-C_4$alkoxy, acetylamino, ureido and sulfo;

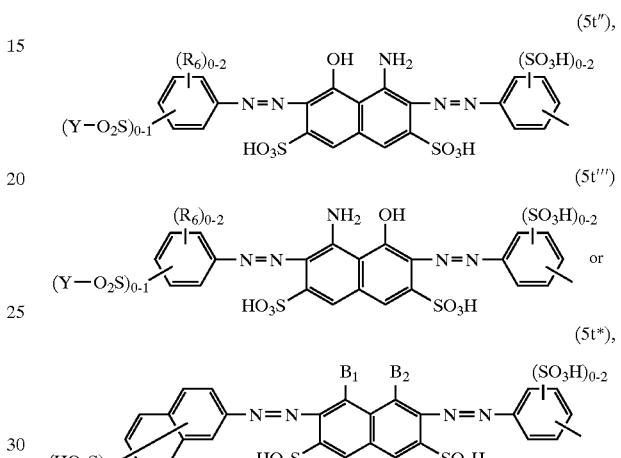

in which $(R_6)_{0-2}$ is 0 to 2 identical or different substituents from the group consisting of methyl, methoxy and sulfo, one of the variables $B_1$ and $B_2$ is hydroxyl and the other is amino and Y is vinyl or β-sulfatoethyl; or

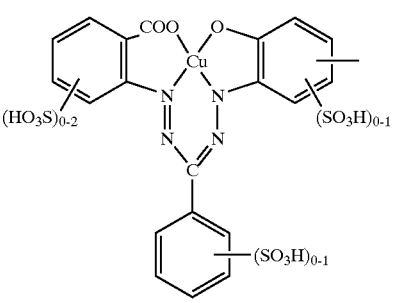
(5v),

The present invention furthermore relates to a process for the preparation of reactive dyes of the formula (1), which comprises reacting in each case about 1 molar equivalent of a compound of the formula $$Z-NH_2 \quad (6),$$

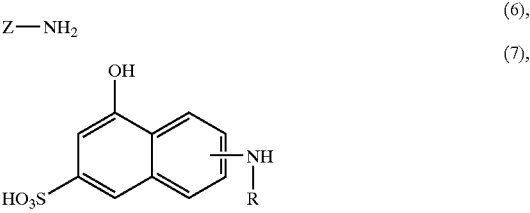
(7),

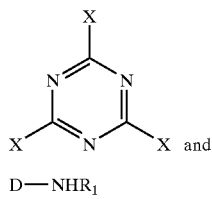 (8)

D—NHR$_1$ (9), in which

D, R, R$_1$, X and Z are each as defined above, with one another in any sequence.

The diazotization of the compound of the formula (6) and coupling of the product with the compound of the formula (7) or a reaction product of the compounds of the formulae (7), (8) and, if appropriate, (9) are carried out in the customary manner, for example by diazotizing the compound of the formula (7) in mineral acid solution, for example hydrochloric acid solution, with a nitrite, for example sodium nitrite, at a low temperature, for example at 0 to 5° C., and then coupling the diazotization product with the corresponding coupling component at a neutral to slightly acid pH, for example at pH 3 to 7, and preferably 5 to 6.5, and low temperatures, for example 0 to 30° C.

The condensation reactions between the compounds of the formulae (7), (8) and (9) are in general carried out analogously to known processes, as a rule in aqueous solution at temperatures of, for example, 0 to 50° C. and a pH of, for example, 4 to 10. If D is, for example, the radical of a monoazo or polyazo chromophore, instead of the compound of the formula (9), it is also possible to employ an intermediate, for example a diazo component or coupling component, in the process and to provide the radical D only in the subsequent course of the process by a corresponding diazotization and coupling reaction. The most important process variants are described in the examples.

The compounds of the formulae (6), (7), (8) and (9) are known or can be prepared analogously to known compounds. Any introduction of a carboxy- or carbamoylpyridinium radical X or X' is as a rule carried out after a condensation reaction of the corresponding cyanuric halides.

The dyes according to the invention are fibre-reactive. Fibre-reactive compounds are to be understood as meaning those which are capable of reacting with the hydroxyl groups of cellulose, the amino, carboxyl, hydroxyl or thio groups of wool and silk, or the amino and, where appropriate, the carboxyl groups of synthetic polyamides to form covalent chemical bonds.

The dyes according to the invention are suitable for dyeing and printing widely varying materials, such as fibre materials containing hydroxyl groups or containing nitrogen. Examples are silk, leather, wool, polyamide fibres and polyurethanes, and in particular all types of cellulosic fibre materials. Such cellulosic fibre materials are, for example, the natural cellulosic fibres, such as cotton, linen and hemp, and cellulose and regenerated cellulose. The dyes according to the invention are also suitable for dyeing or printing fibres, containing hydroxyl groups, which are contained in blend fabrics, for example mixtures of cotton with polyester fibres or polyamide fibres. The dye mixtures according to the invention and the dyes according to the invention are particularly suitable for dyeing or printing cellulosic fibre materials. They can also be used for dyeing or printing natural or synthetic polyamide fibre materials.

The dyes according to the invention can be applied to the fibre material and fixed to the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and the dyes are fixed after treatment with alkali or in the presence of alkali, if appropriate under the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention are distinguished by a high reactivity, good fixing capacity and a very good build-up capacity. They can therefore be employed by the exhaust dyeing method at low dyeing temperatures, and require only short steaming times in the pad-steam method. The degrees of fixing are high and the non-fixed portions can easily be washed off, the difference between the degree of exhaustion and degree of fixing being remarkably low, i.e. the soaping loss is very low. The dyes according to the invention, and in particular the dye mixtures according to the invention, are also particularly suitable for printing, especially on cotton, but also for printing nitrogen-containing fibres, for example wool or silk, or blend fabrics which contain wool or silk.

The dyeings and prints produced with the dyes according to the invention have a high colour strength and a high fibre-dye bond stability both in the acid and in the alkaline range, and furthermore a good light fastness and very good wet fastness properties, such as fastnesses to washing, water, seawater, cross-dyeing and perspiration, as well as a good fastness to pleating, fastness to ironing and fastness to rubbing.

The following examples serve to illustrate the invention. The temperatures are stated in degrees Celcius, parts are parts by weight and percentage data relate to percentages by weight, unless stated otherwise. Parts by weight bear the same relation to parts by volume as the kilogram to the liter.

EXAMPLE 1

18 parts of cyanuric chloride are suspended in 45 parts of ice/water at about 0° C. and the pH is brought to 2 with phosphoric acid. A neutral solution of 32 parts of 1-amino-8-hydroxynaphthalene-3,6-disulfonic acid (H acid) in 320 parts of water is added dropwise and the pH is kept constant at a value of about 2 by addition of sodium hydroxide solution. When the condensation reaction has ended, a neutral solution of 25 parts of 1-hydroxy-6-methylaminonaphthalene-3-sulfonic acid (N-methyl-I acid) in 250 parts of water is added and the pH is increased to 7 and kept constant at this value by addition of sodium hydroxide solution until the condensation reaction has ended.

56 parts of 4-(2-sulfatoethylsulfonyl)aniline are suspended in 560 parts of water, and the pH is brought to 4.5 and the temperature to 0° C. 18 parts of sodium nitrite and 50 parts of concentrated HCl are added, the mixture is stirred at 0° C. for one hour and excess nitrite is destroyed with sulfamic acid (solution of diazo component 1).

The reaction solution prepared above, which comprises the condensation product of cyanuric chloride with H acid and N-methyl-I acid, is added to the solution of the diazo component and the pH is increased to 6.5 and kept at this value during the subsequent coupling. Thereafter, the resulting dye solution is freed from inorganic salts by dialysis and evaporated, the compound of the formula

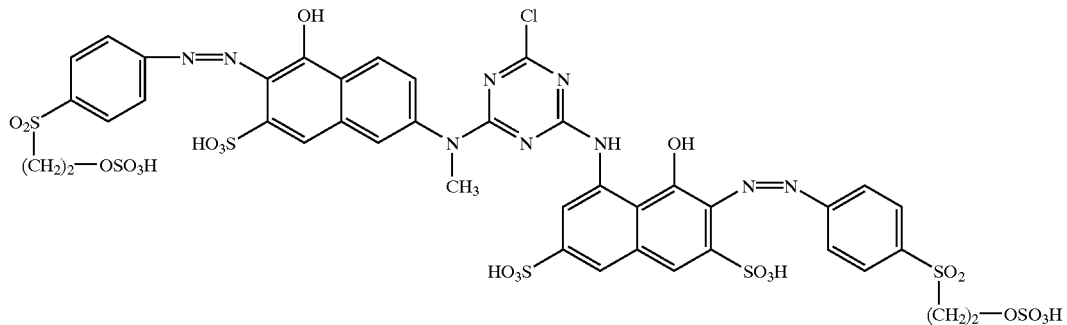

resulting as a red powder which dyes cotton in bright red shades with good allround properties.

EXAMPLES 2 to 8

The compounds of the formula

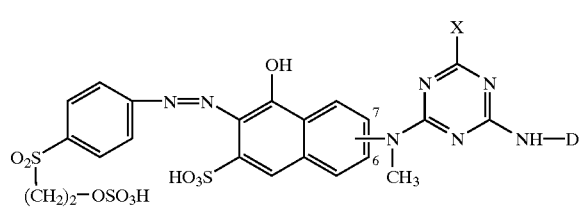

in which D and X are as defined in the following Table 1 and the group —N(CH₃)— has the linkage position stated therein, can be prepared by a procedure analogous to that described in Example 1.

TABLE 1

| Example No. | Position of —N(CH₃) on the naphthyl ring | X | D |
|---|---|---|---|
| 2 | 6 | Cl | 8-Hydroxy-7-(4-[2-sulfatoethylsulfonyl]-phenylazo)-4,6-disulfo-1-naphthyl |
| 3 | 7 | Cl | 8-Hydroxy-7-(4-[2-sulfatoethylsulfonyl]-phenylazo)-3,6-disulfo-1-naphthyl |
| 4 | 7 | Cl | 8-Hydroxy-7-(4-[2-sulfatoethylsulfonyl]-phenylazo)-4,6-disulfo-1-naphthyl |
| 5 | 6 | F | 8-Hydroxy-7-(4-[2-sulfatoethylsulfonyl]-phenylazo)-3,6-disulfo-1-naphthyl |
| 6 | 6 | F | 8-Hydroxy-7-(4-[2-sulfatoethylsulfonyl]-phenylazo)-4,6-disulfo-1-naphthyl |
| 7 | 7 | F | 8-Hydroxy-7-(4-[2-sulfatoethylsulfonyl]-phenylazo)-3,6-disulfo-1-naphthyl |
| 8 | 7 | F | 8-Hydroxy-7-(4-[2-sulfatoethylsulfonyl]-phenylazo)-4,6-disulfo-1-naphthyl |

EXAMPLES 9 to 16

The compounds of the formula

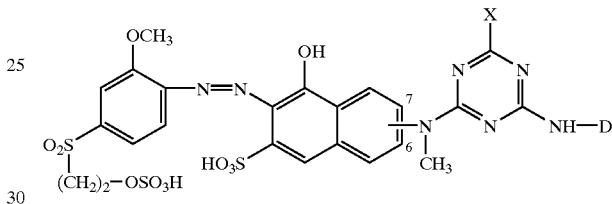

in which D and X are as defined in the following Table 2 and the group —N(CH₃)— has the linkage position stated therein can be prepared by a procedure analogous to that described in Example 1.

TABLE 2

| Example No. | Position of —N(CH₃) on the naphthyl ring | X | D |
|---|---|---|---|
| 9 | 6 | Cl | 8-Hydroxy-7-(2-methoxy-4-[2-sulfatoethylsulfonyl]phenylazo)-3,6-disulfo-1-naphthyl |
| 10 | 6 | Cl | 8-Hydroxy-7-(2-methoxy-4-[2-sulfatoethylsulfonyl]phenylazo)-4,6-disulfo-1-naphthyl |
| 11 | 7 | Cl | 8-Hydroxy-7-(2-methoxy-4-[2-sulfatoethylsulfonyl]phenylazo)-3,6-disulfo-1-naphthyl |
| 12 | 7 | Cl | 8-Hydroxy-7-(2-methoxy-4-[2-sulfatoethylsulfonyl]phenylazo)-4,6-disulfo-1-naphthyl |
| 13 | 6 | F | 8-Hydroxy-7-(2-methoxy-4-[2-sulfatoethylsulfonyl]phenylazo)-3,6-disulfo-1-naphthyl |
| 14 | 6 | F | 8-Hydroxy-7-(2-methoxy-4-[2-sulfatoethylsulfonyl]phenylazo)-4,6-disulfo-1-naphthyl |
| 15 | 7 | F | 8-Hydroxy-7-(2-methoxy-4-[2-sulfatoethylsulfonyl]phenylazo)-3,6-disulfo-1-naphthyl |
| 16 | 7 | F | 8-Hydroxy-7-(2-methoxy-4-[2-sulfatoethylsulfonyl]phenylazo)-4,6-disulfo-1-naphthyl |

EXAMPLES 17 to 24

The compounds of the formula

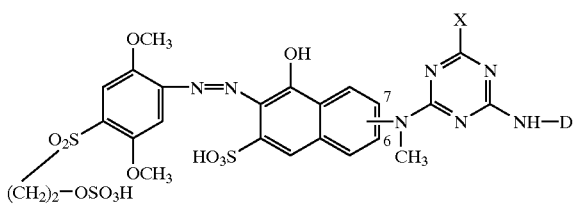

in which D and X are as defined in the following Table 3 and the group —N(CH$_3$)— has the linkage position stated therein, can be prepared by a procedure analogous to that described in Example 1.

TABLE 3

| Example No. | Position of —N(CH$_3$) on the naphthyl ring | X | D |
|---|---|---|---|
| 17 | 6 | Cl | 8-Hydroxy-7-(2,5-dimethoxy-4-[2-sulfatoethylsulfonyl]phenylazo)-3,6-disulfo-1-naphthyl |
| 18 | 6 | Cl | 8-Hydroxy-7-(2-sulfo-4-[2-sulfatoethylsulfonyl]phenylazo)-4,6-disulfo-1-naphthyl |
| 19 | 7 | Cl | 8-Hydroxy-7-(2,5-dimethoxy-4-[2-sulfatoethylsulfonyl]phenylazo)-3,6-disulfo-1-naphthyl |
| 20 | 7 | Cl | 8-Hydroxy-7-(2,5-dimethoxy-4-[2-sulfatoethylsulfonyl]phenylazo)-4,6-disulfo-1-naphthyl |
| 21 | 6 | F | 8-Hydroxy-7-(2,5-dimethoxy-4-[2-sulfatoethylsulfonyl]phenylazo)-3,6-disulfo-1-naphthyl |
| 22 | 6 | F | 8-Hydroxy-7-(2,5-dimethoxy-4-[2-sulfatoethylsulfonyl]phenylazo)-4,6-disulfo-1-naphthyl |
| 23 | 7 | F | 8-Hydroxy-7-(2,5-dimethoxy-4-[2-sulfatoethylsulfonyl]phenylazo)-3,6-disulfo-1-naphthyl |
| 24 | 7 | F | 8-Hydroxy-7-(2,5-dimethoxy-4-[2-sulfatoethylsulfonyl]phenylazo)-4,6-disulfo-1-naphthyl |

EXAMPLES 25 to 32

The compounds of the formula

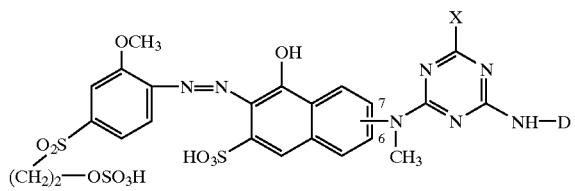

in which D and X are as defined in the following Table 4 and the group —N(CH$_3$)— has the linkage position stated therein, can be prepared by a procedure analogous to that described in Example 1.

TABLE 4

| Example No. | Position of —N(CH$_3$) on the naphthyl ring | X | D |
|---|---|---|---|
| 25 | 6 | Cl | 8-Hydroxy-7-(2-methoxy-5-methyl-4-[2-sulfatoethylsulfonyl]phenylazo)-3,6-disulfo-1-naphthyl |
| 26 | 6 | Cl | 8-Hydroxy-7-(2-methoxy-5-methyl-4-[2-sulfatoethylsulfonyl]phenylazo)-4,6-disulfo-1-naphthyl |
| 27 | 7 | Cl | 8-Hydroxy-7-(2-sulfo-4-[2-sulfatoethylsulfonyl]phenylazo)-3,6-disulfo-1-naphthyl |
| 28 | 7 | Cl | 8-Hydroxy-7-(2-methoxy-5-methyl-4-[2-sulfatoethylsulfonyl]phenylazo)-4,6-disulfo-1-naphthyl |
| 29 | 6 | F | 8-Hydroxy-7-(2-methoxy-5-methyl-4-[2-sulfatoethylsulfonyl]phenylazo)-3,6-disulfo-1-naphthyl |
| 30 | 6 | F | 8-Hydroxy-7-(2-methoxy-5-methyl-4-[2-sulfatoethylsulfonyl]phenylazo)-4,6-disulfo-1-naphthyl |
| 31 | 7 | F | 8-Hydroxy-7-(2-methoxy-5-methyl-4-[2-sulfatoethylsulfonyl]phenylazo)-3,6-disulfo-1-naphthyl |
| 32 | 7 | F | 8-Hydroxy-7-(2-methoxy-5-methyl-4-[2-sulfatoethylsulfonyl]phenylazo)-4,6-disulfo-1-naphthyl |

EXAMPLES 33 to 40

The compounds of the formula

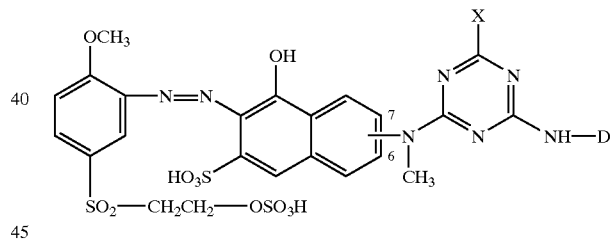

in which D and X are as defined in the following Table 5 and the group —N(CH$_3$)— has the linkage position stated therein, can be prepared by a procedure analogous to that described in Example 1.

TABLE 5

| Example No. | Position of —N(CH$_3$) on the naphthyl ring | X | D |
|---|---|---|---|
| 33 | 6 | Cl | 8-Hydroxy-7-(2-methoxy-5-[2-sulfato-ethylsulfonyl]phenylazo)-3,6-disulfo-1-naphthyl |
| 34 | 6 | Cl | 8-Hydroxy-7-(2-methoxy-5-[2-sulfato-ethylsulfonyl]phenylazo)-4,6-disulfo-1-naphthyl |
| 35 | 7 | Cl | 8-Hydroxy-7-(2-methoxy-5-[2-sulfato-ethylsulfonyl]phenylazo)-3,6-disulfo-1-naphthyl |

TABLE 5-continued

| Example No. | Position of —N(CH₃) on the naphthyl ring | X | D |
|---|---|---|---|
| 36 | 7 | Cl | 8-Hydroxy-7-(2-methoxy-5-[2-sulfato-ethylsulfonyl]phenylazo)-4,6-disulfo-1-naphthyl |
| 37 | 6 | F | 8-Hydroxy-7-(2-methoxy-5-[2-sulfato-ethylsulfonyl]phenylazo)-3,6-disulfo-1-naphthyl |
| 38 | 6 | F | 8-Hydroxy-7-(2-methoxy-5-[2-sulfato-ethylsulfonyl]phenylazo)-4,6-disulfo-1-naphthyl |
| 39 | 7 | F | 8-Hydroxy-7-(2-methoxy-5-[2-sulfato-ethylsulfonyl]phenylazo)-3,6-disulfo-1-naphthyl |
| 40 | 7 | F | 8-Hydroxy-7-(2-methoxy-5-[2-sulfato-ethylsulfonyl]phenylazo)-4,6-disulfo-1-naphthyl |

EXAMPLE 41

18 parts of cyanuric chloride are suspended in 45 parts of ice/water at about 0° C. and the pH is brought to 2 with phosphoric acid. A neutral solution of 32 parts of 1-amino-8-hydroxynaphthalene-3,6-disulfonic acid (H acid) in 320 parts of water is added dropwise and the pH is kept constant at a value of about 2 by addition of sodium hydroxide solution. When the condensation reaction has ended, half the amount of the solution, prepared according to Example 1, of diazo component 1 is added and the pH is controlled by addition of sodium hydroxide solution such that it is constant at about 6.5. When the coupling has ended, a neutral solution of 25 parts of N-methyl-I acid in 250 parts of water is added and the pH is increased to 7 and kept constant at this value by addition of sodium hydroxide solution until the condensation reaction has ended.

The reaction solution is added to a diazo solution which has been prepared beforehand from 20 parts of 2-amino-5-methoxybenzenesulfonic acid in 200 parts of water, 9 parts of sodium nitrite and 25 parts of concentrated HCl, by a procedure analogous to that in Example 1 for the solution of diazo component 1, and the pH is brought to 6.5 with sodium hydroxide solution and kept at this value during the subsequent coupling. At the end, the resulting dye solution is freed from inorganic salts by dialysis and evaporated. The compound of the formula

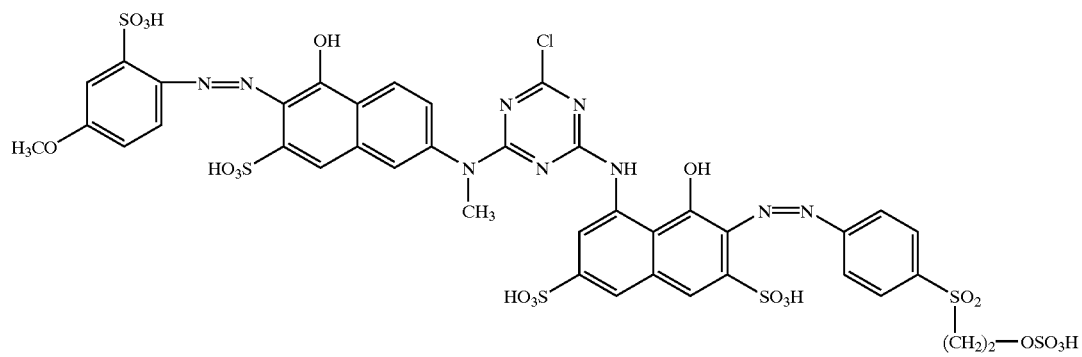

results as a red powder which dyes cotton in bright red shades with good allround properties.

EXAMPLES 42 to 80

The compounds of the formula

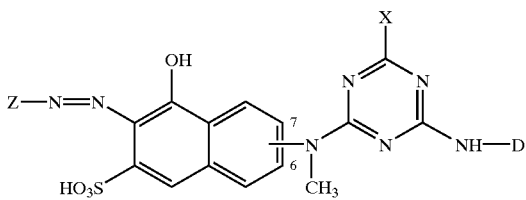

in which D, X and Z are as defined in the following Table 6 and the group —N(CH₃)— has the linkage position stated therein, can be prepared by a procedure analogous to that described in Example 41.

TABLE 6

| Example No. | Position of —N(CH₃) on the naphthyl ring | X | D | Z |
|---|---|---|---|---|
| 42 | 6 | Cl | 8-Hydroxy-7-(4-[2-sulfatoethylsulfonyl]-phenylazo)-3,6-disulfo-1-naphthyl | 2-Methoxy-4-(2-sulfatoethyl-sulfonyl)phenyl |
| 43 | 6 | Cl | 8-Hydroxy-7-(4-[2-sulfatoethylsulfonyl]-phenylazo)-4,6-disulfo-1-naphthyl | 4-Methoxy-2-sulfo-phenyl |
| 44 | 6 | Cl | 8-Hydroxy-7-(4-[2-sulfatoethylsulfonyl]-phenylazo)-4,6-disulfo-1-naphthyl | 2-Sulfo-4-(2-sulfato-ethylsulfonyl)phenyl |
| 45 | 7 | Cl | 8-Hydroxy-7-(4-[2-sulfatoethylsulfonyl]-phenylazo)-3,6-disulfo-1-naphthyl | 4-Methoxy-2-sulfo-phenyl |
| 46 | 7 | Cl | 8-Hydroxy-7-(4-[2-sulfatoethylsulfonyl]-phenylazo)-3,6-disulfo-1-naphthyl | 2-Methoxy-5-methyl-4-(2-sulfato-ethylsulfonyl)phenyl |
| 47 | 7 | Cl | 8-Hydroxy-7-(4-[2-sulfatoethylsulfonyl]-phenylazo)-4,6-disulfo-1-naphthyl | 4-Methoxy-2-sulfo-phenyl |
| 48 | 7 | Cl | 8-Hydroxy-7-(4-[2-sulfatoethylsulfonyl]-phenylazo)-4,6-disulfo-1-naphthyl | 2-Methoxy-5-(2-sulfatoethyl-sulfonyl)phenyl |

TABLE 6-continued

| Example No. | Position of —N(CH₃) on the naphthyl ring | X | D | Z |
|---|---|---|---|---|
| 49 | 6 | Cl | 8-Hydroxy-7-(4-[2-sulfatoethylsulfonyl]-phenylazo)-3,6-disulfo-1-naphthyl | 4-Sulfophenyl |
| 50 | 6 | Cl | 8-Hydroxy-7-(4-[2-sulfatoethylsulfonyl]-phenylazo)-3,6-disulfo-1-naphthyl | 2-Methoxy-4-(2-sulfatoethyl-sulfonyl)phenyl |
| 51 | 6 | F | 8-Hydroxy-7-(4-[2-sulfatoethylsulfonyl]-phenylazo)-3,6-disulfo-1-naphthyl | 4-Methoxy-2-sulfo-phenyl |
| 52 | 6 | F | 8-Hydroxy-7-(4-[2-sulfatoethylsulfonyl]-phenylazo)-3,6-disulfo-1-naphthyl | 2,5 Dimethoxy-4-(2-sulfatoethyl-sulfonyl)phenyl |
| 53 | 6 | F | 8-Hydroxy-7-(4-[2-sulfatoethylsulfonyl]-phenylazo)-4,6-disulfo-1-naphthyl | 4-Methoxy-2-sulfo-phenyl |
| 54 | 6 | F | 8-Hydroxy-7-(4-[2-sulfatoethylsulfonyl]-phenylazo)-4,6-disulfo-1-naphthyl | 2-Methoxy-5-methyl-4-(2-sulfato-ethylsulfonyl)phenyl |
| 55 | 7 | F | 8-Hydroxy-7-(4-[2-sulfatoethylsulfonyl]-phenylazo)-3,6-disulfo-1-naphthyl | 4-Methoxy-2-sulfo-phenyl |
| 56 | 7 | F | 8-Hydroxy-7-(4-[2-sulfatoethylsulfonyl]-phenylazo)-3,6-disulfo-1-naphthyl | 2-Methoxy-5-(2-sulfatoethyl-sulfonyl)phenyl |
| 57 | 7 | F | 8-Hydroxy-7-(4-[2-sulfatoethylsulfonyl]-phenylazo)-4,6-disulfo-1-naphthyl | 4-Methoxy-2-sulfo-phenyl |
| 58 | 7 | F | 8-Hydroxy-7-(4-[2-sulfatoethylsulfonyl]-phenylazo)-4,6-disulfo-1-naphthyl | 2-Methoxy-4-(2-sulfatoethyl-sulfonyl)phenyl |
| 59 | 6 | F | 8-Hydroxy-7-(4-[2-sulfatoethylsulfonyl]-phenylazo)-3,6-disulfo-1-naphthyl | 4-Methyl-2,5-disulfophenyl |
| 60 | 6 | F | 8-Hydroxy-7-(4-[2-sulfatoethylsulfonyl]-phenylazo)-3,6-disulfo-1-naphthyl | 2,5 Dimethoxy-4-(2-sulfatoethyl-sulfonyl)phenyl |
| 61 | 6 | Cl | 8-Hydroxy-7-(4-methoxy-2-sulfo-phenylazo)-3,6-disulfo-1-naphthyl | 4-(2-sulfatoethyl-sulfonyl)phenyl |
| 62 | 6 | Cl | 8-Hydroxy-7-(4-methoxy-2-sulfo-phenylazo)-3,6-disulfo-1-naphthyl | 2-Methoxy-5-methyl-4-(2-sulfato-ethylsulfonyl)phenyl |
| 63 | 6 | Cl | 8-Hydroxy-7-(4-methoxy-2-sulfo-phenylazo)-4,6-disulfo-1-naphthyl | 4-(2-sulfatoethyl-sulfonyl)phenyl |
| 64 | 6 | Cl | 8-Hydroxy-7-(4-methoxy-2-sulfo-phenylazo)-4,6-disulfo-1-naphthyl | 2-Methoxy-5-(2-sulfatoethyl-sulfonyl)phenyl |
| 65 | 7 | Cl | 8-Hydroxy-7-(4-methoxy-2-sulfo-phenylazo)-3,6-disulfo-1-naphthyl | 4-(2-sulfatoethyl-sulfonyl)phenyl |
| 66 | 7 | Cl | 8-Hydroxy-7-(4-methoxy-2-sulfo-phenylazo)-3,6-disulfo-1-naphthyl | 2-Sulfo-4-(2-sulfato-ethylsulfonyl)phenyl |
| 67 | 7 | Cl | 8-Hydroxy-7-(4-methoxy-2-sulfo-phenylazo)-4,6-disulfo-1-naphthyl | 4-(2-sulfatoethyl-sulfonyl)phenyl |
| 68 | 7 | Cl | 8-Hydroxy-7-(4-methoxy-2-sulfo-phenylazo)-4,6-disulfo-1-naphthyl | 2,5 Dimethoxy-4-(2-sulfatoethyl-sulfonyl)phenyl |
| 69 | 6 | Cl | 8-Hydroxy-7-(4-methoxy-2-sulfo-phenylazo)-3,6-disulfo-1-naphthyl | 1-Sulfo-2-naphthyl |
| 70 | 6 | Cl | 8-Hydroxy-7-(4-methoxy-2-sulfo-phenylazo)-3,6-disulfo-1-naphthyl | 2-Methoxy-5-methyl-4-(2-sulfato-ethylsulfonyl)phenyl |
| 71 | 6 | F | 8-Hydroxy-7-(4-methoxy-2-sulfo-phenylazo)-3,6-disulfo-1-naphthyl | 4-(2-sulfatoethyl-sulfonyl)phenyl |
| 72 | 6 | F | 8-Hydroxy-7-(4-methoxy-2-sulfo-phenylazo)-3,6-disulfo-1-naphthyl | 2-Methoxy-5-(2-sulfatoethyl-sulfonyl)phenyl |
| 73 | 6 | F | 8-Hydroxy-7-(4-methoxy-2-sulfo-phenylazo)-4,6-disulfo-1-naphthyl | 4-(2-sulfatoethyl-sulfonyl)phenyl |
| 74 | 6 | F | 8-Hydroxy-7-(4-methoxy-2-sulfo-phenylazo)-4,6-disulfo-1-naphthyl | 2-Methoxy-4-(2-sulfatoethyl-sulfonyl)phenyl |
| 75 | 7 | F | 8-Hydroxy-7-(4-methoxy-2-sulfo-phenylazo)-3,6-disulfo-1-naphthyl | 4-(2-sulfatoethyl-sulfonyl)phenyl |
| 76 | 7 | F | 8-Hydroxy-7-(4-methoxy-2-sulfo-phenylazo)-3,6-disulfo-1-naphthyl | 2,5 Dimethoxy-4-(2-sulfatoethyl-sulfonyl)phenyl |
| 77 | 7 | F | 8-Hydroxy-7-(4-methoxy-2-sulfo-phenylazo)-4,6-disulfo-1-naphthyl | 4-(2-sulfatoethyl-sulfonyl)phenyl |
| 78 | 7 | F | 8-Hydroxy-7-(4-methoxy-2-sulfo-phenylazo)-4,6-disulfo-1-naphthyl | 2-Methoxy-5-methyl-4-(2-sulfato-ethylsulfonyl)phenyl |
| 79 | 6 | F | 8-Hydroxy-7-(4-methoxy-2-sulfo-phenylazo)-3,6-disulfo-1-naphthyl | 1-Sulfo-2-naphthyl |
| 80 | 6 | F | 8-Hydroxy-7-(4-methoxy-2-sulfo-phenylazo)-3,6-disulfo-1-naphthyl | 2-Methoxy-5-(2-sulfatoethyl-sulfonyl)phenyl |

EXAMPLE 81

18 parts of cyanuric chloride are suspend in 45 parts of ice/water at a temperature of 0° C. and the pH is brought to 7 with phosphate buffer solution. A solution of 27 parts of 2,5-diaminobenzene-1,4-disulfonic acid is added dropwise, during which the pH is kept constant at 7 by addition of sodium hydroxide solution. When the condensation reaction has ended, 9 parts of sodium nitrite and 25 parts of concentrated HCl are added and the mixture is stirred at 0° C. for one hour. After excess nitrite has been destroyed with sulfamic acid, 20 parts of finely powdered 5-carbamoyl-1-ethyl-2-hydroxy-4-methyl-6-pyridone are introduced and the pH is increased to 7 with sodium hydroxide solution and kept at this value until the reaction is complete. When the coupling has ended, a neutral solution of 25 parts of 1-hydroxy-6-methylaminonaphthaline-3-sulfonic acid (N-methyl-I acid) in 250 parts of water is added and the pH is increased to 7 and kept constant at this value by addition of sodium hydroxide solution until the condensation reaction has ended. The resulting reaction solution is added to half the amount of the solution, obtained according to Example 1, of diazo component 1 and the pH is increased to 6.5 and kept at this value during the subsequent coupling. Thereafter, the resulting dye solution is freed from inorganic salts by dialysis and evaporated, the compound of the formula

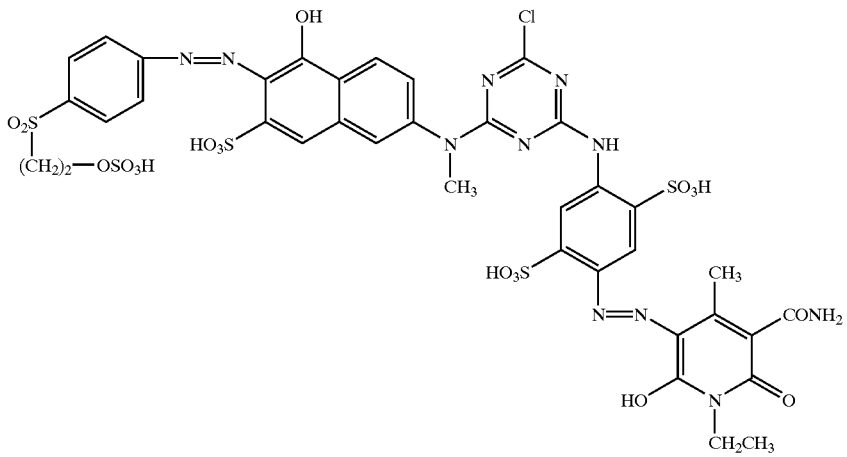

resulting as a powder which dyes cotton in bright orange-red shades with good allround properties.

EXAMPLES 82 to 96

The compounds of the formula

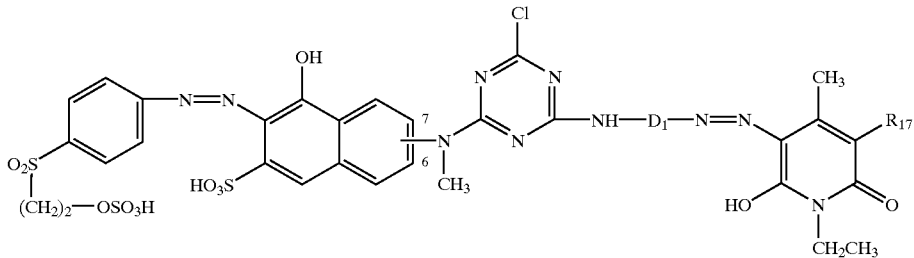

in which $D_1$ and $R_{17}$ are as defined in the following Table 7 and the group —N(CH$_3$)— has the linkage position stated therein can be prepared by a procedure analogous to that described in Example 81.

TABLE 7

| Example No. | Position of —N(CH$_3$) on the naphthyl ring | $D_1$ | $R_{17}$ |
|---|---|---|---|
| 82 | 6 | 1-Sulfo-2,4-phenylene | —CONH$_2$ |
| 83 | 6 | 1-Sulfo-2,5-phenylene | —CONH$_2$ |

TABLE 7-continued

| Example No. | Position of —N(CH$_3$) on the naphthyl ring | $D_1$ | $R_{17}$ |
|---|---|---|---|
| 84 | 6 | 1,3-Disulfo-4,6-phenylene | —CONH$_2$ |
| 85 | 7 | 1-Sulfo-2,4-phenylene | —CONH$_2$ |
| 86 | 7 | 1-Sulfo-2,5-phenylene | —CONH$_2$ |
| 87 | 7 | 1,3-Disulfo-4,6-phenylene | —CONH$_2$ |
| 88 | 7 | 1,4-Disulfo-2,5-phenylene | —CONH$_2$ |
| 89 | 6 | 1-Sulfo-2,4-phenylene | —CH$_2$SO$_3$H |

TABLE 7-continued

| Example No. | Position of —N(CH$_3$) on the naphthyl ring | $D_1$ | $R_{17}$ |
|---|---|---|---|
| 90 | 6 | 1,4-Disulfo-2,5-phenylene | —CH$_2$—SO$_3$H |
| 91 | 6 | 1-Sulfo-2,5-phenylene | —CH$_2$—SO$_3$H |
| 92 | 6 | 1,3-Disulfo-4,6-phenylene | —CH$_2$—SO$_3$H |
| 93 | 7 | 1-Sulfo-2,4-phenylene | —CH$_2$—SO$_3$H |
| 94 | 7 | 1-Sulfo-2,5-phenylene | —CH$_2$—SO$_3$H |

TABLE 7-continued

| Example No. | Position of —N(CH$_3$) on the naphthyl ring D$_1$ | | R$_{17}$ |
|---|---|---|---|
| 95 | 7 | 1,3-Disulfo-4,6-phenylene | —CH$_2$—SO$_3$H |
| 96 | 7 | 1,4-Disulfo-2,5-phenylene | —CH$_2$—SO$_3$H |

EXAMPLES 97 to 111

The compounds of the formula

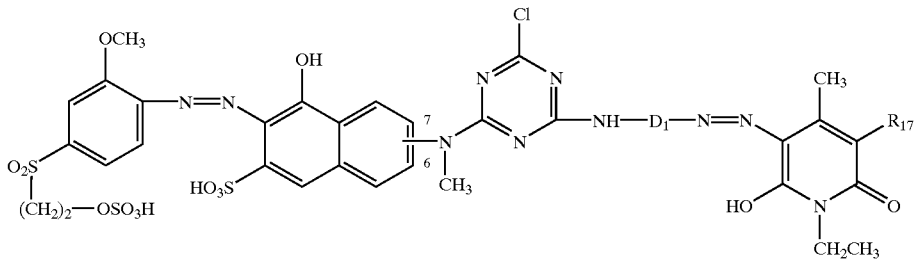

in which D$_1$ and R$_{17}$ are as defined in the following Table 8 and the group —N(CH$_3$)— has the linkage position stated therein, can be prepared by a procedure analogous to that described in Example 81.

TABLE 8

| Example No. | Position of —N(CH$_3$) on the naphthyl ring D$_1$ | | R$_{17}$ |
|---|---|---|---|
| 97  | 6 | 1-Sulfo-2,4-phenylene     | —CONH$_2$ |
| 98  | 6 | 1-Sulfo-2,5-phenylene     | —CONH$_2$ |
| 99  | 6 | 1,3-Disulfo-4,6-phenylene | —CONH$_2$ |
| 100 | 7 | 1-Sulfo-2,4-phenylene     | —CONH$_2$ |
| 101 | 7 | 1-Sulfo-2,5-phenylene     | —CONH$_2$ |
| 102 | 7 | 1,3-Disulfo-4,6-phenylene | —CONH$_2$ |
| 103 | 7 | 1,4-Disulfo-2,5-phenylene | —CONH$_2$ |
| 104 | 6 | 1-Sulfo-2,4-phenylene     | —CH$_2$SO$_3$H |
| 105 | 6 | 1,4-Disulfo-2,5-phenylene | —CH$_2$—SO$_3$H |
| 106 | 6 | 1-Sulfo-2,5-phenylene     | —CH$_2$—SO$_3$H |
| 107 | 6 | 1,3-Disulfo-4,6-phenylene | —CH$_2$—SO$_3$H |
| 108 | 7 | 1-Sulfo-2,4-phenylene     | —CH$_2$—SO$_3$H |
| 109 | 7 | 1-Sulfo-2,5-phenylene     | —CH$_2$—SO$_3$H |
| 110 | 7 | 1,3-Disulfo-4,6-phenylene | —CH$_2$—SO$_3$H |
| 111 | 7 | 1,4-Disulfo-2,5-phenylene | —CH$_2$—SO$_3$H |

EXAMPLES 112 to 126

The compounds of the formula

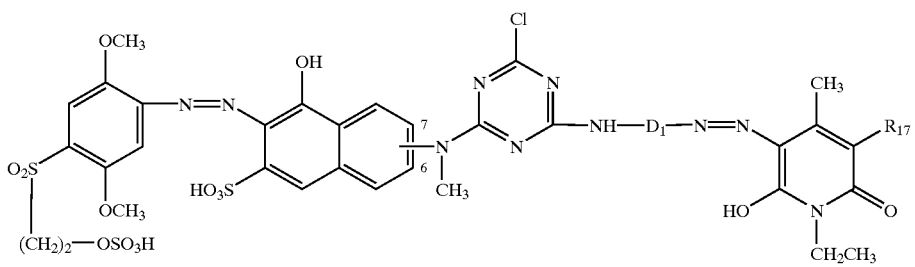

in which D$_1$ and R$_{17}$ are as defined in the following Table 9 and the group —N(CH$_3$)— has the linkage position stated therein, can be prepared by a procedure analogous to that described in Example 81.

TABLE 9

| Example No. | Position of —N(CH$_3$) on the naphthyl ring D$_1$ | | R$_{17}$ |
|---|---|---|---|
| 112 | 6 | 1-Sulfo-2,4-phenylene | —CONH$_2$ |
| 113 | 6 | 1-Sulfo-2,5-phenylene | —CONH$_2$ |
| 114 | 6 | 1,3-Disulfo-4,6-phenylene | —CONH$_2$ |
| 115 | 7 | 1-Sulfo-2,4-phenylene | —CONH$_2$ |
| 116 | 7 | 1-Sulfo-2,5-phenylene | —CONH$_2$ |
| 117 | 7 | 1,3-Disulfo-4,6-phenylene | —CONH$_2$ |
| 118 | 7 | 1,4-Disulfo-2,5-phenylene | —CONH$_2$ |
| 119 | 6 | 1-Sulfo-2,4-phenylene | —CH$_2$SO$_3$H |
| 120 | 6 | 1,4-Disulfo-2,5-phenylene | —CH$_2$—SO$_3$H |
| 121 | 6 | 1-Sulfo-2,5-phenylene | —CH$_2$—SO$_3$H |
| 122 | 6 | 1,3-Disulfo-4,6-phenylene | —CH$_2$—SO$_3$H |
| 123 | 7 | 1-Sulfo-2,4-phenylene | —CH$_2$—SO$_3$H |
| 124 | 7 | 1-Sulfo-2,5-phenylene | —CH$_2$—SO$_3$H |
| 125 | 7 | 1,3-Disulfo-4,6-phenylene | —CH$_2$—SO$_3$H |
| 126 | 7 | 1,4-Disulfo-2,5-phenylene | —CH$_2$—SO$_3$H |

EXAMPLES 127 to 141

The compounds of the formula

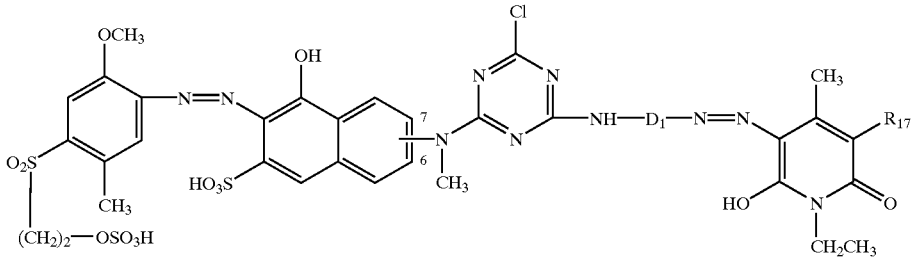

in which D$_1$ and R$_{17}$ are as defined in the following Table 10 and the group —N(CH$_3$)— has the linkage position stated therein can be prepared by a procedure analogous to that described in Example 81.

TABLE 10

| Example No. | Position of —N(CH$_3$) on the naphthyl ring D$_1$ | | R$_{17}$ |
|---|---|---|---|
| 127 | 6 | 1-Sulfo-2,4-phenylene | —CONH$_2$ |
| 128 | 6 | 1-Sulfo-2,5-phenylene | —CONH$_2$ |
| 129 | 6 | 1,3-Disulfo-4,6-phenylene | —CONH$_2$ |
| 130 | 7 | 1-Sulfo-2,4-phenylene | —CONH$_2$ |
| 131 | 7 | 1-Sulfo-2,5-phenylene | —CONH$_2$ |
| 132 | 7 | 1,3-Disulfo-4,6-phenylene | —CONH$_2$ |
| 133 | 7 | 1,4-Disulfo-2,5-phenylene | —CONH$_2$ |
| 134 | 6 | 1-Sulfo-2,4-phenylene | —CH$_2$SO$_3$H |
| 135 | 6 | 1,4-Disulfo-2,5-phenylene | —CH$_2$—SO$_3$H |
| 136 | 6 | 1-Sulfo-2,5-phenylene | —CH$_2$—SO$_3$H |
| 137 | 6 | 1,3-Disulfo-4,6-phenylene | —CH$_2$—SO$_3$H |
| 138 | 7 | 1-Sulfo-2,4-phenylene | —CH$_2$—SO$_3$H |
| 139 | 7 | 1-Sulfo-2,5-phenylene | —CH$_2$—SO$_3$H |
| 140 | 7 | 1,3-Disulfo-4,6-phenylene | —CH$_2$—SO$_3$H |
| 141 | 7 | 1,4-Disulfo-2,5-phenylene | —CH$_2$—SO$_3$H |

EXAMPLES 142 to 156

The compounds of the formula

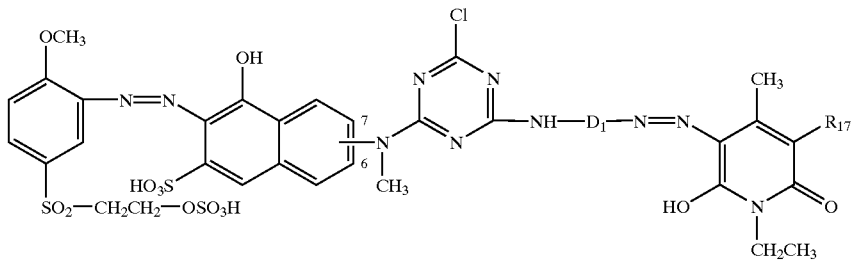

in which $D_1$ and $R_{17}$ are as defined in the following Table 11 and the group —N(CH$_3$)— has the linkage position stated therein, can be prepared by a procedure analogous to that described in Example 81.

TABLE 11

| Example No. | Position of —N(CH$_3$) on the naphthyl ring D$_1$ | | R$_{17}$ |
|---|---|---|---|
| 142 | 6 | 1-Sulfo-2,4-phenylene | —CONH$_2$ |
| 143 | 6 | 1-Sulfo-2,5-phenylene | —CONH$_2$ |
| 144 | 6 | 1,3-Disulfo-4,6-phenylene | —CONH$_2$ |
| 145 | 7 | 1-Sulfo-2,4-phenylene | —CONH$_2$ |
| 146 | 7 | 1-Sulfo-2,5-phenylene | —CONH$_2$ |
| 147 | 7 | 1,3-Disulfo-4,6-phenylene | —CONH$_2$ |
| 148 | 7 | 1,4-Disulfo-2,5-phenylene | —CONH$_2$ |
| 149 | 6 | 1-Sulfo-2,4-phenylene | —CH$_2$SO$_3$H |
| 150 | 6 | 1,4-Disulfo-2,5-phenylene | —CH$_2$—SO$_3$H |
| 151 | 6 | 1-Sulfo-2,5-phenylene | —CH$_2$—SO$_3$H |
| 152 | 6 | 1,3-Disulfo-4,6-phenylene | —CH$_2$—SO$_3$H |
| 153 | 7 | 1-Sulfo-2,4-phenylene | —CH$_2$—SO$_3$H |
| 154 | 7 | 1-Sulfo-2,5-phenylene | —CH$_2$—SO$_3$H |
| 155 | 7 | 1,3-Disulfo-4,6-phenylene | —CH$_2$—SO$_3$H |
| 156 | 7 | 1,4-Disulfo-2,5-phenylene | —CH$_2$—SO$_3$H |

EXAMPLE 157

14 parts of cyanuric fluoride are added dropwise to a cold solution of 25 parts of N-methyl-I acid in 250 parts of water at pH 4.5. When the condensation reaction has ended, a neutral solution of 27 parts of 2,5-diaminobenzene-1,4-disulfonic acid is added and the pH is kept constant by addition of sodium hydroxide solution. When the condensation reaction has ended, 9 parts of sodium nitrite and 25 parts of concentrated HCl are added and the mixture is stirred at 0° C. for one hour. After excess nitrite has been destroyed with sulfamic acid, 20 parts of finely powdered 5-carbamoyl-1-ethyl-2-hydroxy4-methyl-6-pyridone are introduced, and the pH is increased to 7 with sodium hydroxide solution and kept at this value until the reaction is complete. The resulting reaction solution is added to half the amount of the solution, obtained according to Example 1, of diazo component 1 and the pH is increased to 6.5 and kept at this value during the subsequent coupling. Thereafter, the resulting dye solution is freed from inorganic salts by dialysis and evaporated, the compound of the formula

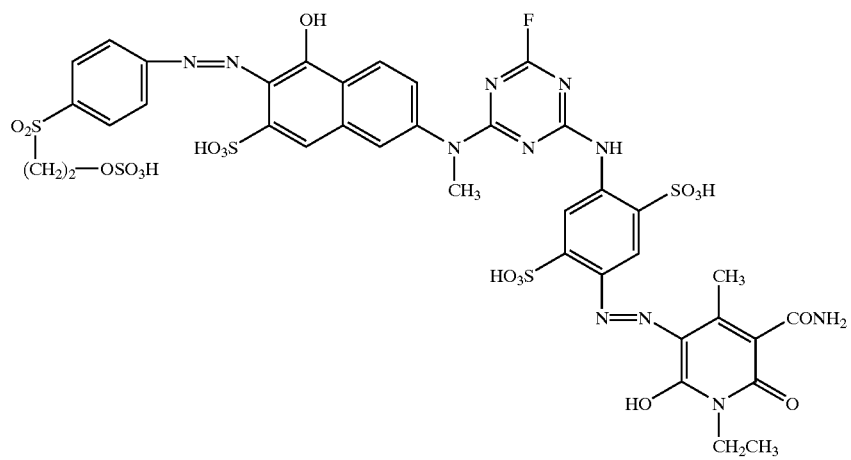

resulting as a powder which dyes cotton in bright orange-red shades with good allround properties.

EXAMPLES 158 to 172

The compounds of the formula

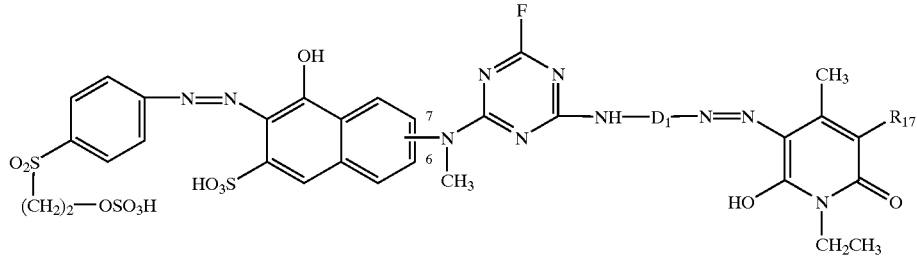

in which $D_1$ and $R_{17}$ are as defined in the following Table 12 and the group —N(CH₃)— has the linkage position stated therein, can be prepared by a procedure analogous to that described in Example 157.

TABLE 12

| Example No. | Position of —N(CH₃) on the naphthyl ring $D_1$ | $R_{17}$ |
|---|---|---|---|
| 158 | 6 | 1-Sulfo-2,4-phenylene | —CONH₂ |
| 159 | 6 | 1-Sulfo-2,5-phenylene | —CONH₂ |
| 160 | 6 | 1,3-Disulfo-4,6-phenylene | —CONH₂ |
| 161 | 7 | 1-Sulfo-2,4-phenylene | —CONH₂ |
| 162 | 7 | 1-Sulfo-2,5-phenylene | —CONH₂ |
| 163 | 7 | 1,3-Disulfo-4,6-phenylene | —CONH₂ |
| 164 | 7 | 1,4-Disulfo-2,5-phenylene | —CONH₂ |
| 165 | 6 | 1-Sulfo-2,4-phenylene | —CH₂—SO₃H |
| 166 | 6 | 1,4-Disulfo-2,5-phenylene | —CH₂—SO₃H |
| 167 | 6 | 1-Sulfo-2,5-phenylene | —CH₂—SO₃H |
| 168 | 6 | 1,3-Disulfo-4,6-phenylene | —CH₂—SO₃H |
| 169 | 7 | 1-Sulfo-2,4-phenylene | —CH₂—SO₃H |
| 170 | 7 | 1-Sulfo-2,5-phenylene | —CH₂—SO₃H |
| 171 | 7 | 1,3-Disulfo-4,6-phenylene | —CH₂—SO₃H |
| 172 | 7 | 1,4-Disulfo-2,5-phenylene | —CH₂—SO₃H |

TABLE 13

| Example No. | Position of —N(CH₃) on the naphthyl ring $D_1$ | $R_{17}$ |
|---|---|---|---|
| 173 | 6 | 1-Sulfo-2,4-phenylene | —CONH₂ |
| 174 | 6 | 1-Sulfo-2,5-phenylene | —CONH₂ |
| 175 | 6 | 1,3-Disulfo-4,6-phenylene | —CONH₂ |
| 176 | 7 | 1-Sulfo-2,4-phenylene | —CONH₂ |
| 177 | 7 | 1-Sulfo-2,5-phenylene | —CONH₂ |
| 178 | 7 | 1,3-Disulfo-4,6-phenylene | —CONH₂ |
| 179 | 7 | 1,4-Disulfo-2,5-phenylene | —CONH₂ |
| 180 | 6 | 1-Sulfo-2,4-phenylene | —CH₂SO₃H |
| 181 | 6 | 1,4-Disulfo-2,5-phenylene | —CH₂—SO₃H |
| 182 | 6 | 1-Sulfo-2,5-phenylene | —CH₂—SO₃H |
| 183 | 6 | 1,3-Disulfo-4,6-phenylene | —CH₂—SO₃H |
| 184 | 7 | 1-Sulfo-2,4-phenylene | —CH₂—SO₃H |
| 185 | 7 | 1-Sulfo-2,5-phenylene | —CH₂—SO₃H |
| 186 | 7 | 1,3-Disulfo-4,6-phenylene | —CH₂—SO₃H |
| 187 | 7 | 1,4-Disulfo-2,5-phenylene | —CH₂—SO₃H |

EXAMPLES 173 to 187

The compounds of the formula

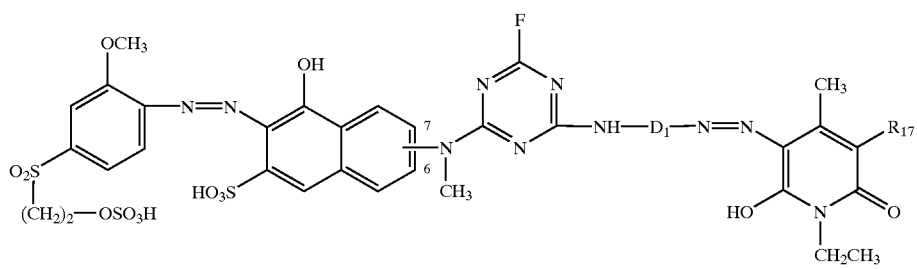

in which $D_1$ and $R_{17}$ are as defined in the following Table 13 and the group —N(CH₃)— has the linkage position stated therein, can be prepared by a procedure analogous to that described in Example 157.

EXAMPLES 188 to 202

The compounds of the formula

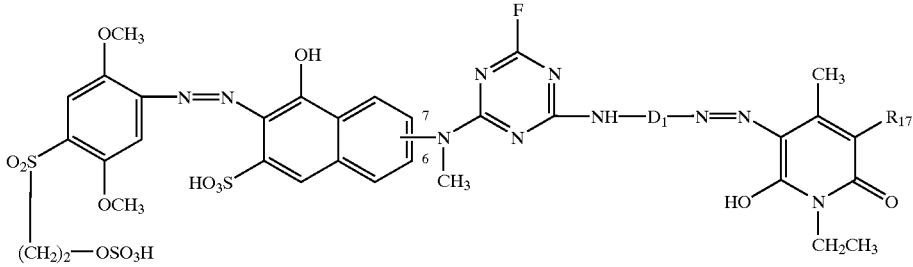

in which $D_1$ and $R_{17}$ are as defined in the following Table 14 and the group —N(CH$_3$)— has the linkage position stated therein, can be prepared by a procedure analogous to that described in Example 157.

TABLE 14

| Example No. | Position of —N(CH$_3$) on the naphthyl ring $D_1$ | | $R_{17}$ |
|---|---|---|---|
| 188 | 6 | 1-Sulfo-2,4-phenylene | —CONH$_2$ |
| 189 | 6 | 1-Sulfo-2,5-phenylene | —CONH$_2$ |
| 190 | 6 | 1,3-Disulfo-4,6-phenylene | —CONH$_2$ |
| 191 | 7 | 1-Sulfo-2,4-phenylene | —CONH$_2$ |
| 192 | 7 | 1-Sulfo-2,5-phenylene | —CONH$_2$ |
| 193 | 7 | 1,3-Disulfo-4,6-phenylene | —CONH$_2$ |
| 194 | 7 | 1,4-Disulfo-2,5-phenylene | —CONH$_2$ |
| 195 | 6 | 1-Sulfo-2,4-phenylene | —CH$_2$SO$_3$H |
| 196 | 6 | 1,4-Disulfo-2,5-phenylene | —CH$_2$—SO$_3$H |
| 197 | 6 | 1-Sulfo-2,5-phenylene | —CH$_2$—SO$_3$H |
| 198 | 6 | 1,3-Disulfo-4,6-phenylene | —CH$_2$—SO$_3$H |
| 199 | 7 | 1-Sulfo-2,4-phenylene | —CH$_2$—SO$_3$H |
| 200 | 7 | 1-Sulfo-2,5-phenylene | —CH$_2$—SO$_3$H |
| 201 | 7 | 1,3-Disulfo-4,6-phenylene | —CH$_2$—SO$_3$H |
| 202 | 7 | 1,4-Disulfo-2,5-phenylene | —CH$_2$—SO$_3$H |

EXAMPLES 203 to 217

The compounds of the formula

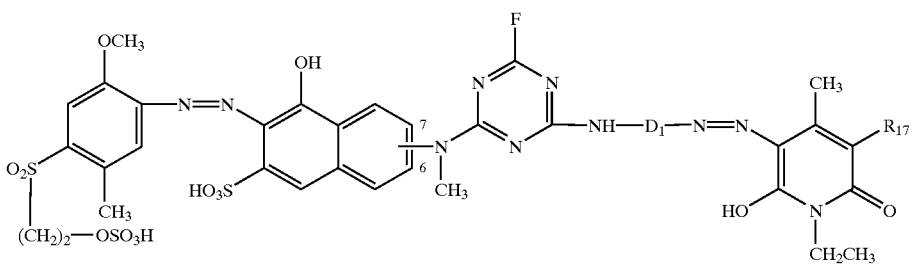

in which $D_1$ and $R_{17}$ are as defined in the following Table 15 and the group —N(CH$_3$)— has the linkage position stated therein, can be prepared by a procedure analogous to that described in Example 157.

TABLE 15

| Example No. | Position of —N(CH$_3$) on the naphthyl ring $D_1$ | | $R_{17}$ |
|---|---|---|---|
| 203 | 6 | 1-Sulfo-2,4-phenylene | —CONH$_2$ |
| 204 | 6 | 1-Sulfo-2,5-phenylene | —CONH$_2$ |
| 205 | 6 | 1,3-Disulfo-4,6-phenylene | —CONH$_2$ |
| 206 | 7 | 1-Sulfo-2,4-phenylene | —CONH$_2$ |
| 207 | 7 | 1-Sulfo-2,5-phenylene | —CONH$_2$ |
| 208 | 7 | 1,3-Disulfo-4,6-phenylene | —CONH$_2$ |
| 209 | 7 | 1,4-Disulfo-2,5-phenylene | —CONH$_2$ |
| 210 | 6 | 1-Sulfo-2,4-phenylene | —CH$_2$SO$_3$H |
| 211 | 6 | 1,4-Disulfo-2,5-phenylene | —CH$_2$—SO$_3$H |
| 212 | 6 | 1-Sulfo-2,5-phenylene | —CH$_2$—SO$_3$H |
| 213 | 6 | 1,3-Disulfo-4,6-phenylene | —CH$_2$—SO$_3$H |
| 214 | 7 | 1-Sulfo-2,4-phenylene | —CH$_2$—SO$_3$H |
| 215 | 7 | 1-Sulfo-2,5-phenylene | —CH$_2$—SO$_3$H |
| 216 | 7 | 1,3-Disulfo-4,6-phenylene | —CH$_2$—SO$_3$H |
| 217 | 7 | 1,4-Disulfo-2,5-phenylene | —CH$_2$—SO$_3$H |

EXAMPLES 218 to 232

The compound of the formula

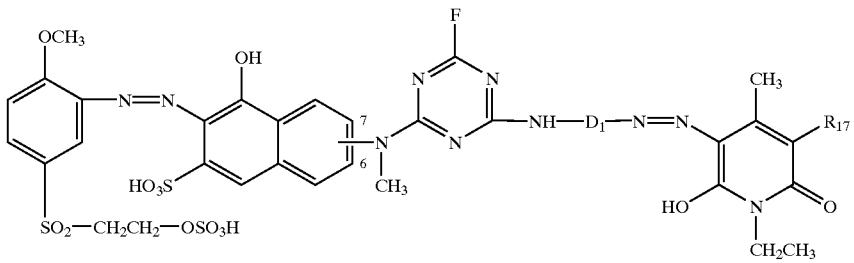

in which $D_1$ and $R_{17}$ are as defined in the following Table 16 and the group —N(CH$_3$)— has the linkage position stated therein, can be prepared by a procedure analogous to that described in Example 157.

TABLE 16

| Example No. | Position of —N(CH$_3$)— on the naphthyl ring $D_1$ | | $R_{17}$ |
|---|---|---|---|
| 218 | 6 | 1-Sulfo-2,4-phenylene | —CONH$_2$ |
| 219 | 6 | 1-Sulfo-2,5-phenylene | —CONH$_2$ |
| 220 | 6 | 1,3-Disulfo-4,6-phenylene | —CONH$_2$ |
| 221 | 7 | 1-Sulfo-2,4-phenylene | —CONH$_2$ |
| 222 | 7 | 1-Sulfo-2,5-phenylene | —CONH$_2$ |
| 223 | 7 | 1,3-Disulfo-4,6-phenylene | —CONH$_2$ |
| 224 | 7 | 1,4-Disulfo-2,5-phenylene | —CONH$_2$ |
| 225 | 6 | 1-Sulfo-2,4-phenylene | —CH$_2$SO$_3$H |
| 226 | 6 | 1,4-Disulfo-2,5-phenylene | —CH$_2$—SO$_3$H |
| 227 | 6 | 1-Sulfo-2,5-phenylene | —CH$_2$—SO$_3$H |
| 228 | 6 | 1,3-Disulfo-4,6-phenylene | —CH$_2$—SO$_3$H |
| 229 | 7 | 1-Sulfo-2,4-phenylene | —CH$_2$—SO$_3$H |

TABLE 16-continued

| Example No. | Position of —N(CH$_3$)— on the naphthyl ring $D_1$ | | $R_{17}$ |
|---|---|---|---|
| 230 | 7 | 1-Sulfo-2,5-phenylene | —CH$_2$—SO$_3$H |
| 231 | 7 | 1,3-Disulfo-4,6-phenylene | —CH$_2$—SO$_3$H |
| 232 | 7 | 1,4-Disulfo-2,5-phenylene | —CH$_2$—SO$_3$H |

EXAMPLE 233

18 parts of cyanuric chloride are suspended in 45 parts of ice/water at 0° C. and the pH is brought to 7 with phosphate buffer. A solution of 25 parts of N-methyl-I acid in 250 parts of water is added dropwise and the pH is kept constant by addition of sodium hydroxide solution. The reaction solution obtained after the condensation reaction is added to half the amount of the solution, obtained according to Example 1, of diazo component 1 and the pH is increased to 6.5 and kept at this value during the subsequent coupling. A solution of 47 parts of 3-ureido-4-(4,8-disulfonaphthyl-2-azo)-aniline in 470 parts of water is added dropwise and the pH is kept constant at 7 by addition of sodium hydroxide solution. After removal of the salts and evaporation, a powder which, in the form of the free acid, has the formula

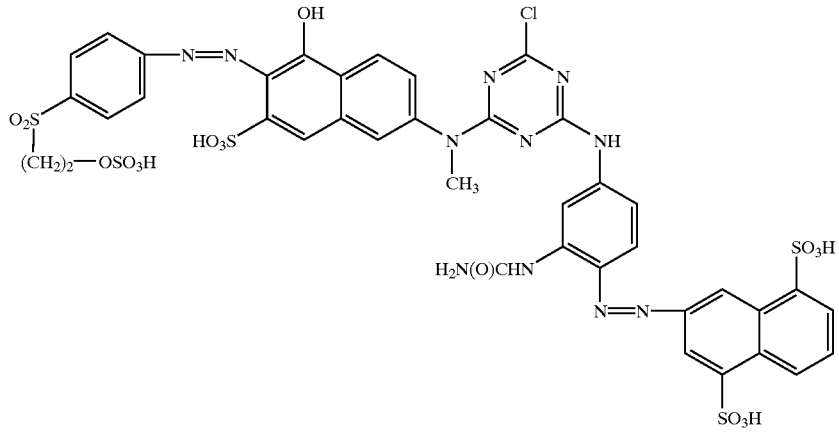

and dyes cellulose in bright orange-red shades with good allround properties is obtained.
The dyes of the formulae
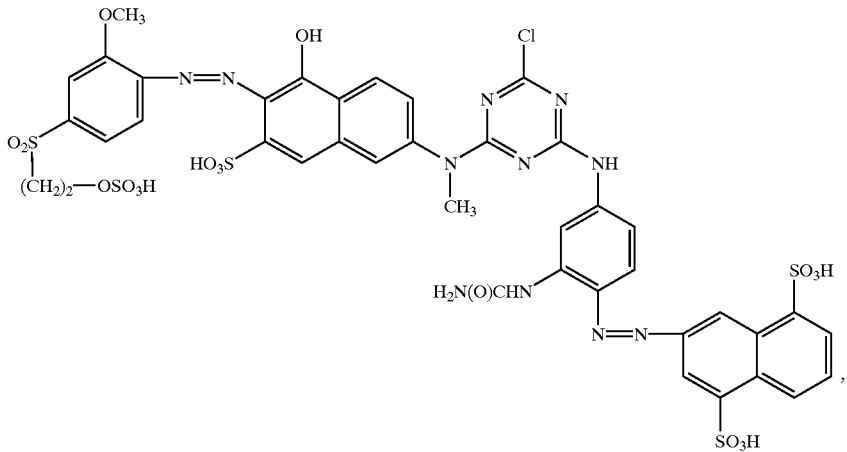
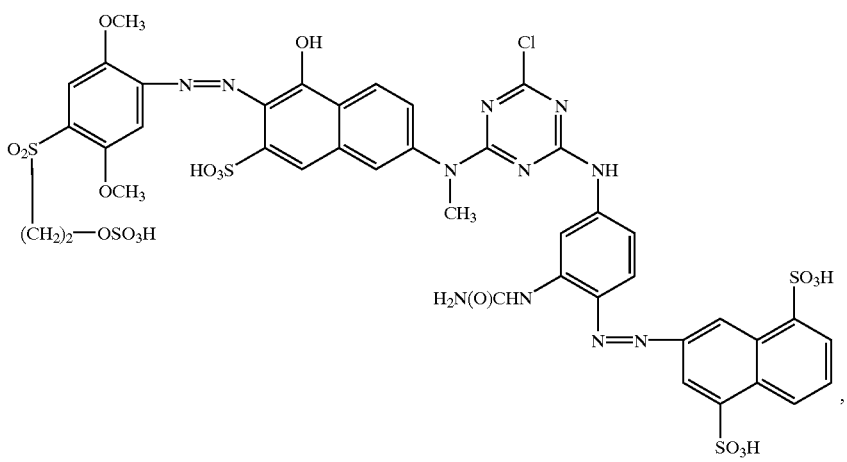
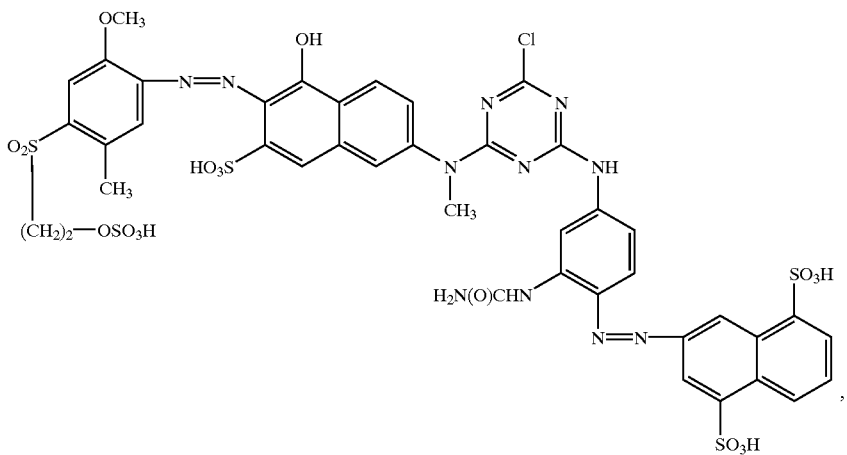

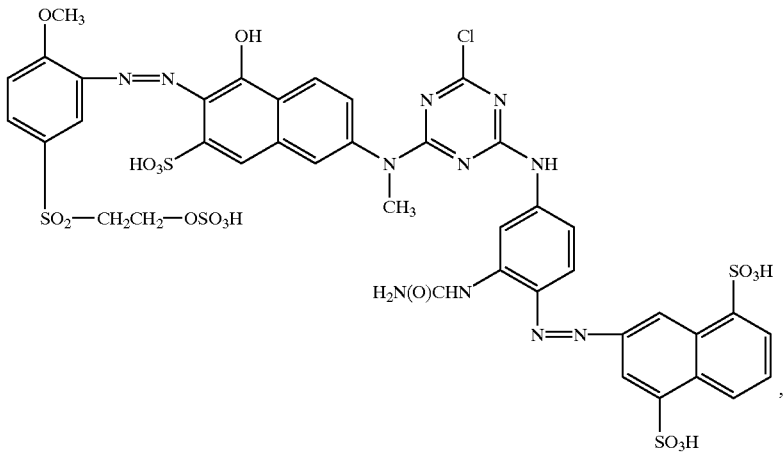

can be obtained in an analogous manner to that described in Example 233.

EXAMPLE 234

The procedure described in Example 233 is repeated, using the equivalent amount of N-methyl-γ acid instead of N-methyl-I acid. The compound of the formula

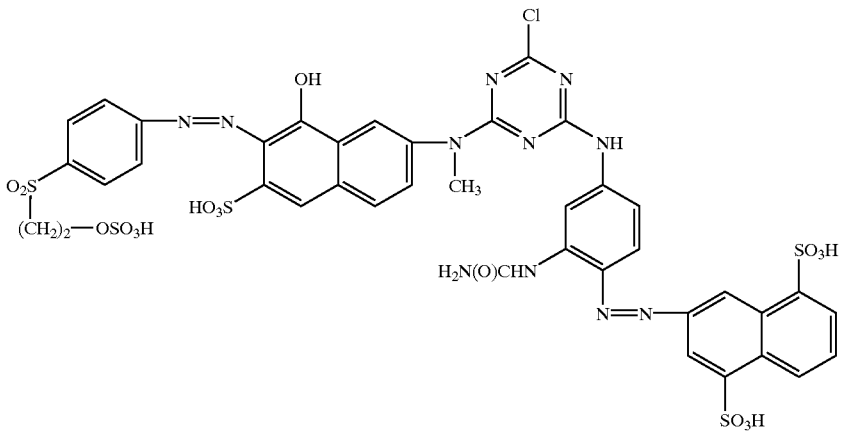

which likewise dyes cellulose in bright orange-red shades with good allround properties, is obtained.

The following dyestuffs of the formulae

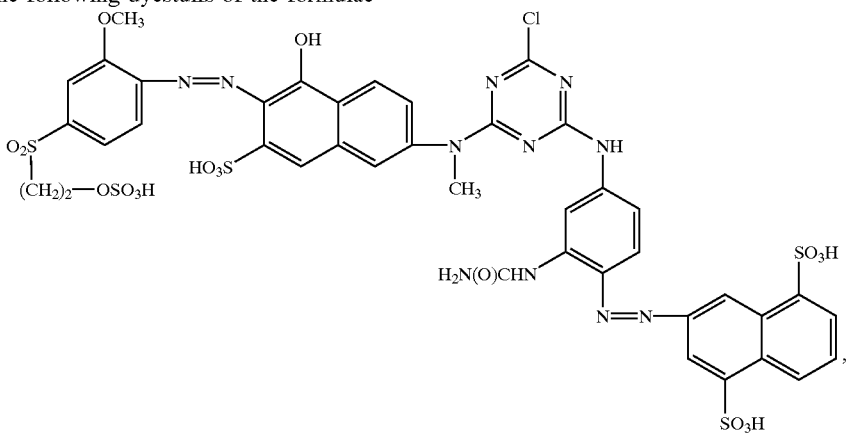

-continued
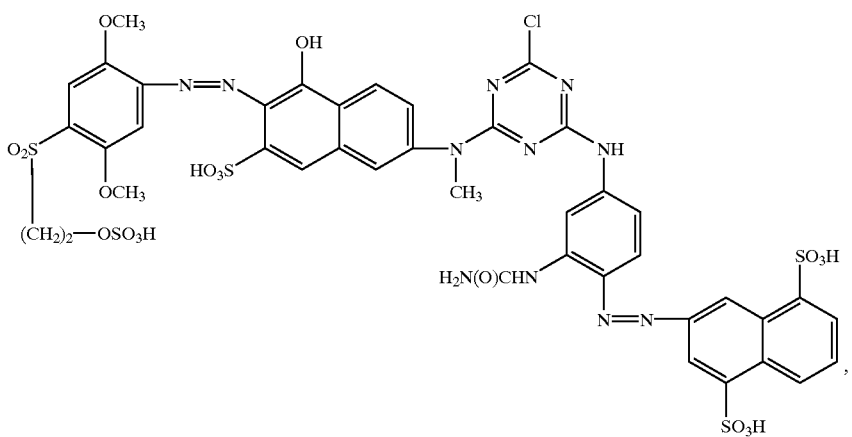
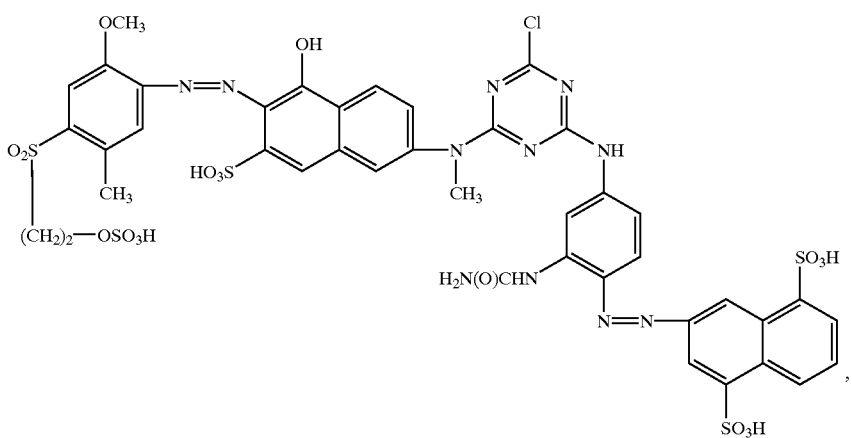
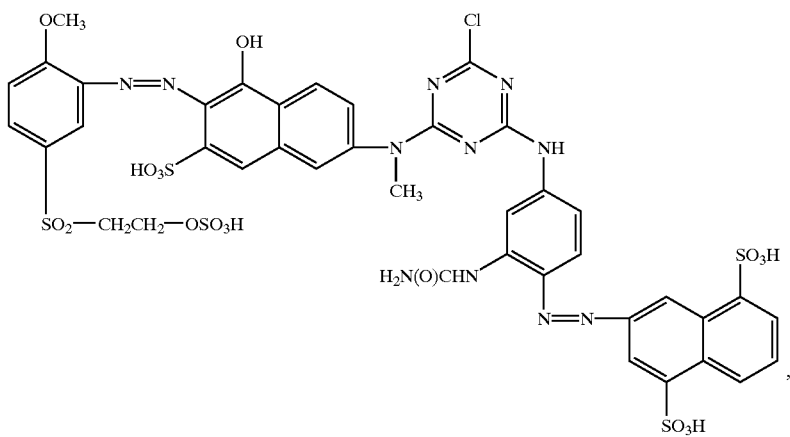

can be obtained in a manner analogous to that described in Example 234.

EXAMPLE 235

The procedure described in Example 234 is repeated, using an equivalent amount of the compound of the formula

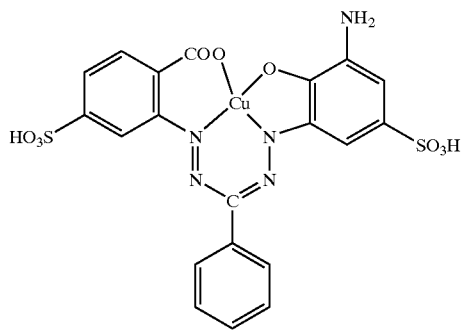

instead of 47 parts of 3-ureido-4-(4,8-disulfonaphthyl-2-azo)aniline. The compound of the formula

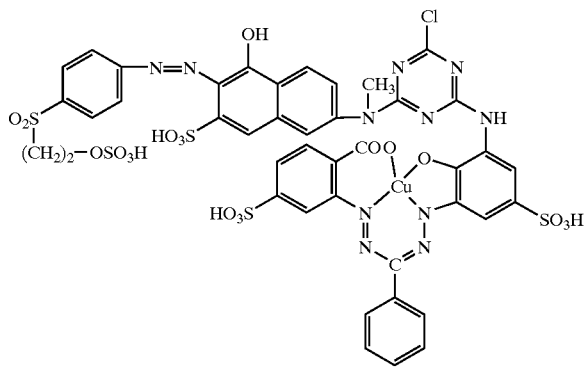

which dyes cellulose in an olive shade with good allround properties, is obtained.

The dyes of the formulae

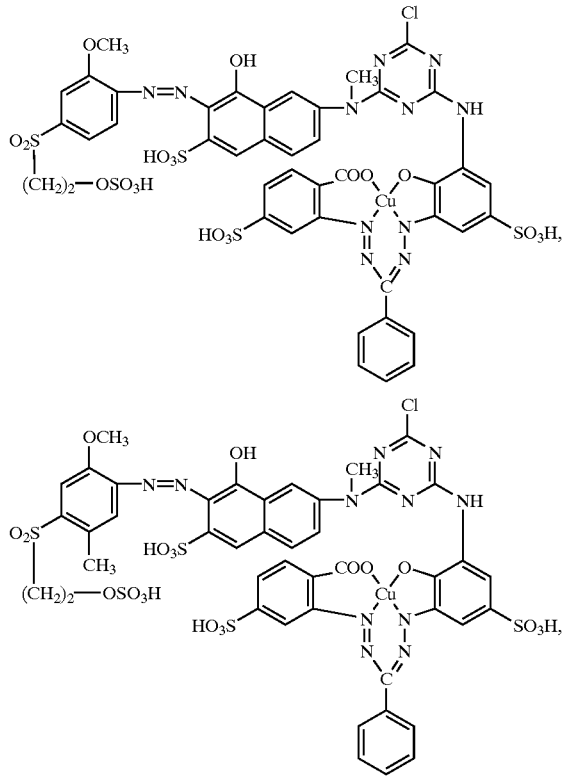

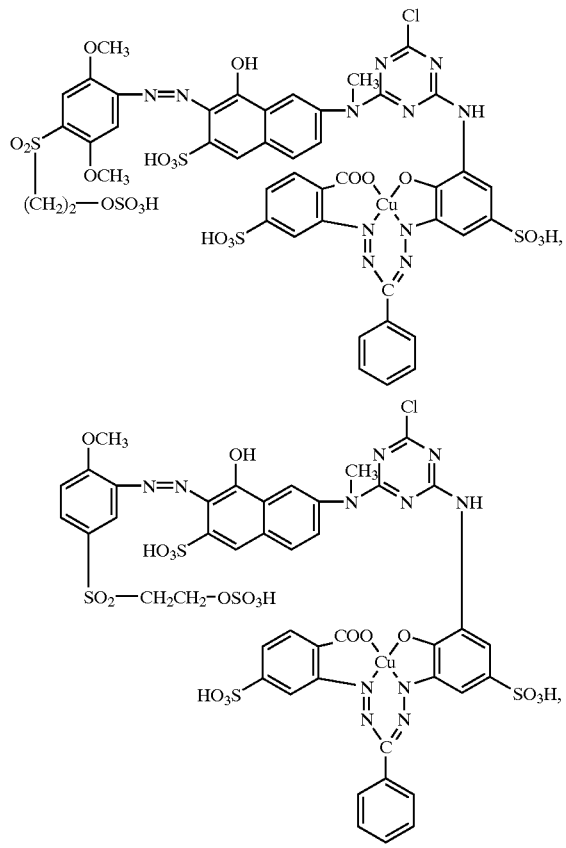

can be obtained in a manner analogous to that described in Example 235.

EXAMPLE 236

A neutral solution of 32 parts of H acid in 320 parts of water is added dropwise at 0° C. to the reaction solution of 28 parts of 4-(2-sulfatoethylsulfonyl)aniline diazotized according to Example 1, and the pH is kept constant at 2.5 by addition of sodium hydroxide solution until the coupling is complete.

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid.

The two reaction solutions prepared above are combined, the pH is increased to 7.5 and the mixture is stirred for one hour.

When the coupling has ended, a neutral solution of 25 parts of 1-hydroxy-6-methylaminonaphthalene-3-sulfonic acid (N-methyl-I acid) in 250 parts of water is added and the pH is increased to 7 and kept constant at this value by addition of sodium hydroxide solution until the condensation reaction has ended. The reaction solution is added to a solution of 28 parts of 4-(2-sulfatoethylsulfonyl)aniline diazotized according to Example 1 and the pH is increased to 6.5 and kept at this value during the subsequent coupling. Thereafter, the resulting dye solution is freed from inorganic salts by dialysis and evaporated to give the compound of the formula

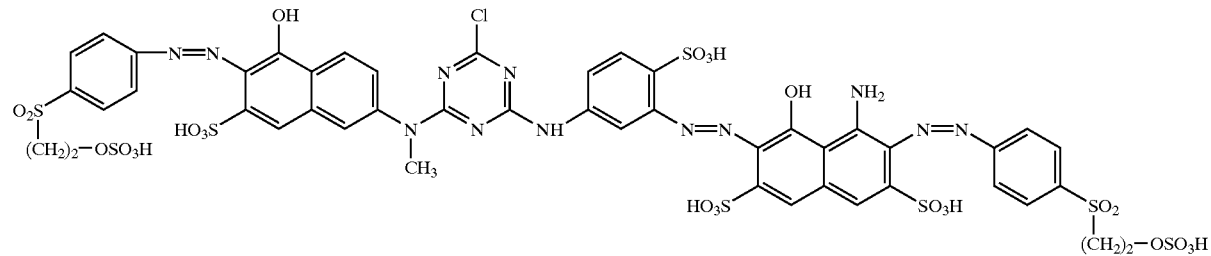

which dyes cellulose in a black shade with good allround properties.

The dyes of the formulae

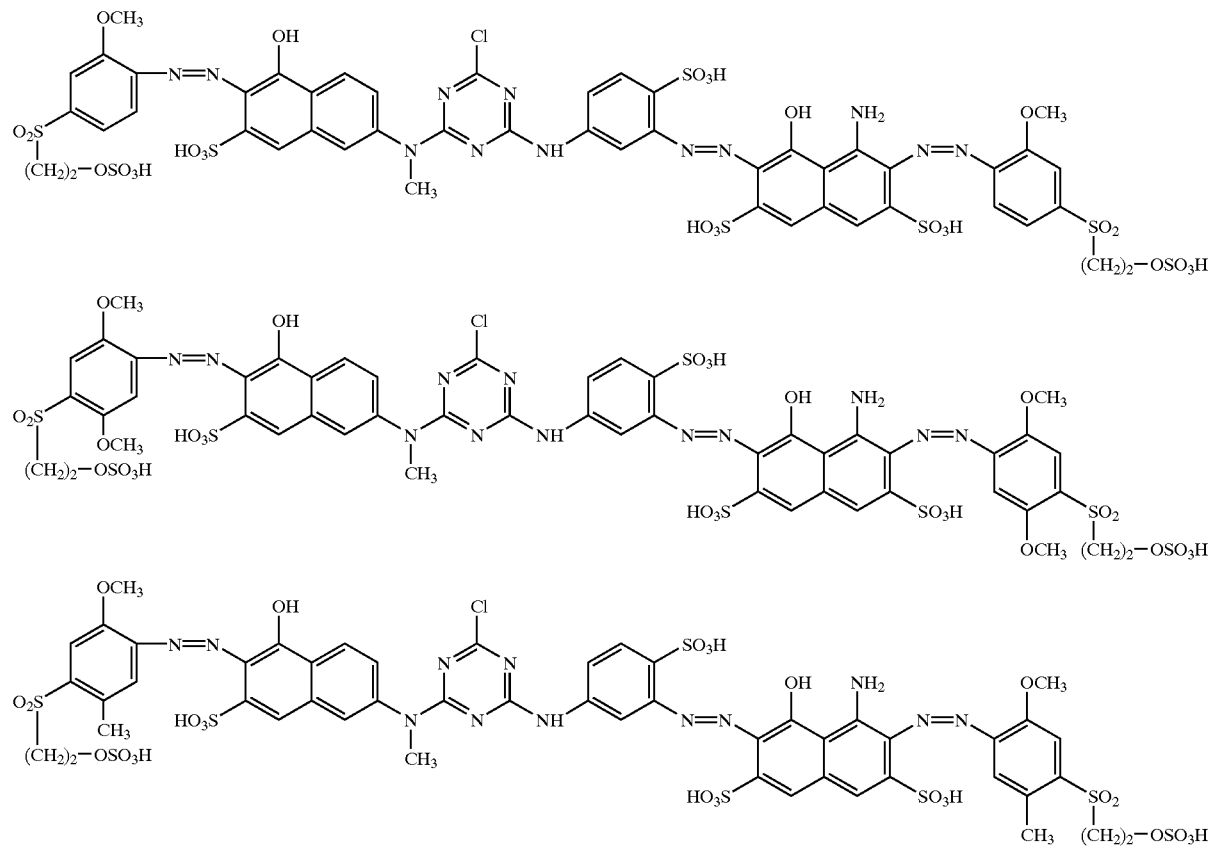

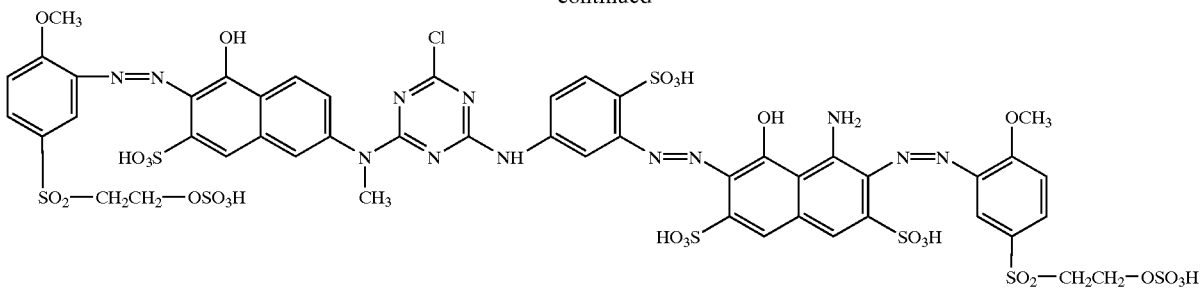

can be obtained in a manner analogous to that described in Example 236.

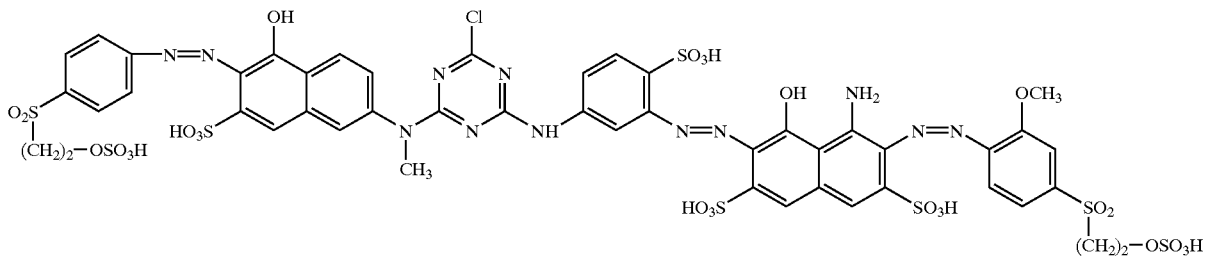

EXAMPLE 237

56 parts of 2-methoxy-4-(2-sulfatoethylsulfonyl)aniline are suspended in 560 parts of water and the pH is brought to 4.5 and the temperature to 0° C. 18 parts of sodium nitrite and 50 parts of concentrated HCl are added, the mixture is stirred at 0° C. for one hour and excess nitrite is destroyed with sulfamic acid.

A neutral solution of 32 parts of H acid in 320 parts of water is added dropwise at 0° C. to the reaction solution of 28 parts of 2-methoxy-4-(2-sulfatoethylsulfonyl)aniline, diazotized as described above, and the pH is kept constant at 2.5 by addition of sodium hydroxide solution until the coupling is complete.

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid.

The two reaction solutions prepared above are combined, the pH is increased to 7.5 and the mixture is stirred for one hour.

When the coupling has ended, a neutral solution of 25 parts of 1-hydroxy-6-methylaminonaphthaline-3-sulfonic acid (N-Methyl-I acid) in 250 parts of water is added and the pH is increased to 7 and kept constant at this value by addition of sodium hydroxide solution until the condensation reaction has ended. The reaction solution is added to a solution of 28 parts of 4-(2-sulfatoethylsulfonyl)aniline diazotized according to Example 1 and the pH is increased to 6.5 and kept at this value during the subsequent coupling. Thereafter, the resulting dye solution is freed from inorganic salts by dialysis and evaporated to give the compound of the formula which dyes cellulose in a black shade with good allround properties.

EXAMPLE 238

A neutral solution of 32 parts of H acid in 320 parts of water is added dropwise at 0° C. to the reaction solution of 28 parts of 4-(2-sulfatoethylsulfonyl)aniline, diazotized according to Example 1, and the pH is kept constant at 2.5 by addition of sodium hydroxide solution until the coupling is complete.

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid.

The two reaction solutions prepared above are combined, the pH is increased to 7.5 and the mixture is stirred for one hour.

When the coupling has ended, a neutral solution of 25 parts of 1-hydroxy-6-methylaminonaphthaline-3-sulfonic acid (N-methyl-I acid) in 250 parts of water is added and the pH is increased to 7 and kept constant at this value by addition of sodium hydroxide solution until the condensation reaction has ended.

The reaction solution is added to a solution of 28 parts of 2-methoxy-4-(2-sulfatoethylsulfonyl)aniline diazotized according to Example 237, and the pH is increased to 6.5 and kept at this value during the subsequent coupling. Thereafter, the resulting dye solution is freed from inorganic salts by dialysis and evaporated to give the compound of the formula

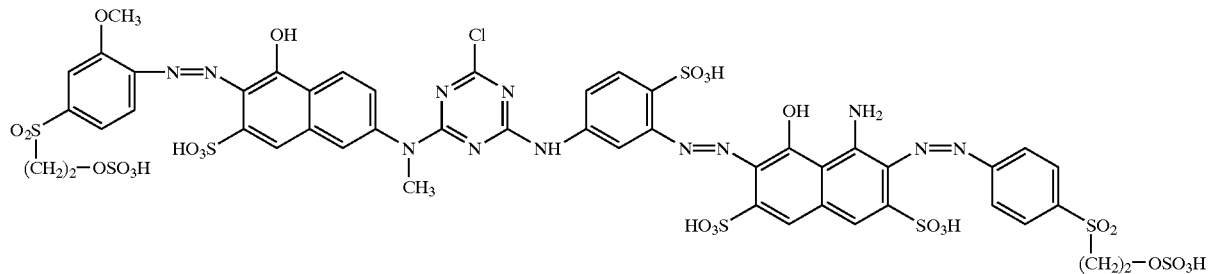

which dyes cellulose in a black shade with good allround properties.

EXAMPLES 239 to 250

Dyes of the general formula

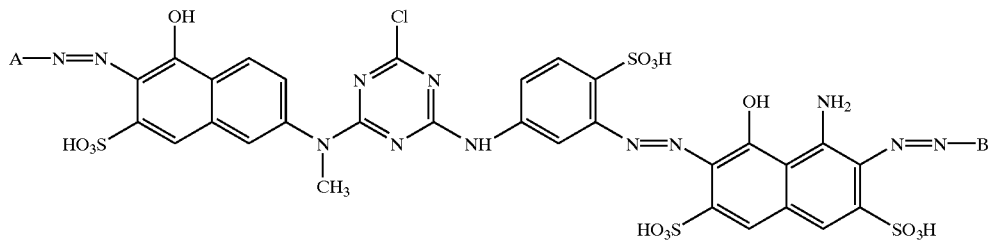

in which A and B are as defined in the following Table 17, can be obtained in a manner analogous to that described in Examples 237 and 238.

TABLE 17

| Ex. | A | B |
|---|---|---|
| 239 | 4-(2-Sulfatoethylsulfonyl)phenyl | 2,5 Dimethoxy-4-(2-sulfato-ethylsulfonyl)phenyl |
| 240 | 4-(2-Sulfatoethylsulfonyl)phenyl | 2-Methoxy-5-methyl-4-(2-sulfatoethylsulfonyl)phenyl |
| 241 | 4-(2-Sulfatoethylsulfonyl)phenyl | 2-Methoxy-5-(2-sulfatoethyl-sulfonyl)phenyl |
| 242 | 2,5 Dimethoxy-4-(2-sulfato-ethylsulfonyl)phenyl | 2-Methoxy-5-methyl-4-(2-sulfatoethylsulfonyl)phenyl |
| 243 | 2,5 Dimethoxy-4-(2-sulfato-ethylsulfonyl)phenyl | 2-Methoxy-5-(2-sulfatoethyl-sulfonyl)phenyl |
| 244 | 2-Methoxy-5-methyl-4-(2-sulfatoethylsulfonyl)phenyl | 2-Methoxy-5-(2-sulfatoethyl-sulfonyl)phenyl |
| 245 | 2,5 Dimethoxy-4-(2-sulfato-ethylsulfonyl)phenyl | 4-(2-Sulfatoethylsulfonyl)phenyl |
| 246 | 2-Methoxy-5-methyl-4-(2-sulfatoethylsulfonyl)phenyl | 4-(2-Sulfatoethylsulfonyl)phenyl |
| 247 | 2-Methoxy-5-(2-sulfatoethyl-sulfonyl)phenyl | 4-(2-Sulfatoethylsulfonyl)phenyl |
| 248 | 2-Methoxy-5-methyl-4-(2-sulfatoethylsulfonyl)phenyl | 2,5 Dimethoxy-4-(2-sulfato-ethylsulfonyl)phenyl |
| 249 | 2-Methoxy-5-(2-sulfatoethyl-sulfonyl)phenyl | 2,5 Dimethoxy-4-(2-sulfato-ethylsulfonyl)phenyl |
| 250 | 2-Methoxy-5-(2-sulfatoethyl-sulfonyl)phenyl | 2-Methoxy-5-methyl-4-(2-sulfatoethylsulfonyl)phenyl |

EXAMPLES 251 to 266

The compounds of the formula

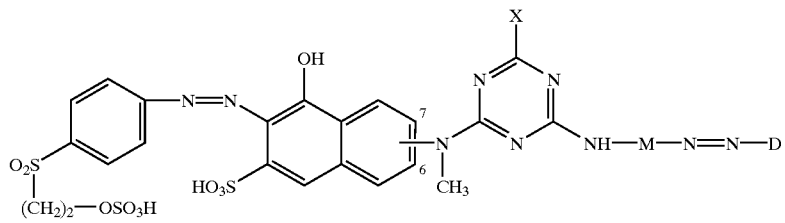

in which D, M and X are as defined in the following Table 18 and the group —N(CH₃)— has the linkage position stated therein, can be prepared by a procedure analogous to that described in Example 236.

TABLE 18

| Example No. | Position of —N(CH₃) on the naphthyl ring | X | D | M |
|---|---|---|---|---|
| 251 | 6 | Cl | 1-Hydroxy-7-(4-[2-sulfatoethyl-sulfonyl]phenylazo)-3,5-disulfo-8-amino-2-naphthyl | 1-Sulfo-2,4-phenylene |
| 252 | 7 | Cl | 1-Hydroxy-7-(4-[2-sulfatoethyl-sulfonyl]phenylazo)-3,6-disulfo-8-amino-2-naphthyl | 1-Sulfo-2,4-phenylene |
| 253 | 7 | Cl | 1-Hydroxy-7-(4-[2-sulfatoethyl-sulfonyl]phenylazo)-3,5-disulfo-8-amino-2-naphthyl | 1-Sulfo-2,4-phenylene |
| 254 | 6 | Cl | 1-Hydroxy-7-(4-[2-sulfatoethyl-sulfonyl]phenylazo)-3,6-disulfo-8-amino-2-naphthyl | 1,3-Disulfo-4,6-phenylene |
| 255 | 6 | Cl | 1-Hydroxy-7-(4-methoxy-2-sulfo-phenylazo)-3,6-disulfo-8-amino-2-naphthyl | 1-Sulfo-2,4-phenylene |
| 256 | 6 | Cl | 1-Hydroxy-7-(4-methoxy-2-sulfo-phenylazo)-3,5-disulfo-8-amino-2-naphthyl | 1-Sulfo-2,4-phenylene |
| 257 | 7 | Cl | 1-Hydroxy-7-(4-methoxy-2-sulfo-phenylazo)-3,6-disulfo-8-amino-2-naphthyl | 1-Sulfo-2,4-phenylene |
| 258 | 7 | Cl | 1-Hydroxy-7-(4-methoxy-2-sulfo-phenylazo)-3,5-disulfo-8-amino-2-naphthyl | 1-Sulfo-2,4-phenylene |
| 259 | 6 | Cl | 1-Hydroxy-7-(4-methoxy-2-sulfo-phenylazo)-3,6-disulfo-8-amino-2-naphthyl | 1,3-Disulfo-4,6-phenylene |
| 260 | 6 | Cl | 1-Hydroxy-7-(1-sulfo-2-naphthyl-azo)-3,6-disulfo-8-amino-2-naphthyl | 1,3-Disulfo-4,6-phenylene |
| 261 | 6 | F | 1-Hydroxy-7-(4-methoxy-2-sulfo-phenylazo)-3,6-disulfo-8-amino-2-naphthyl | 1-Sulfo-2,4-phenylene |
| 262 | 6 | F | 1-Hydroxy-7-(4-methoxy-2-sulfo-phenylazo)-3,5-disulfo-8-amino-2-naphthyl | 1-Sulfo-2,4-phenylene |
| 263 | 7 | F | 1-Hydroxy-7-(4-methoxy-2-sulfo-phenylazo)-3,6-disulfo-8-amino-2-naphthyl | 1-Sulfo-2,4-phenylene |
| 264 | 7 | F | 1-Hydroxy-7-(4-methoxy-2-sulfo-phenylazo)-3,5-disulfo-8-amino-2-naphthyl | 1-Sulfo-2,4-phenylene |
| 265 | 6 | F | 1-Hydroxy-7-(4-methoxy-2-sulfo-phenylazo)-3,6-disulfo-8-amino-2-naphthyl | 1-3-Disulfo-4,6-phenylene |
| 266 | 6 | F | 1-Hydroxy-7-(1-sulfo-2-naphthyl-azo)-3,6-disulfo-8-amino-2-naphthyl | 1-3-Disulfo-4,6-phenylene |

EXAMPLE 267

14 parts of cyanuric fluoride are added dropwise to a cold solution of 19 parts of 2,4-diaminobenzenesulfonic acid in 190 parts of water at pH 5 and the pH is kept constant by addition of sodium hydroxide solution until the condensation reaction has ended. Thereafter, a neutral solution of 25 parts of N-methyl-I acid in 250 parts of water is added and the pH is increased to 7 and kept constant at this value by addition of sodium hydroxide solution until the condensation reaction has ended. The reaction solution is then added to a solution of 28 parts of 4-(2-sulfatoethylsulfonyl)aniline diazotized according to Example 1, and the pH is increased to 7 and kept at this value during the subsequent coupling reaction. Thereafter, the product is rediazotized by addition of 9 parts of sodium nitrite and 25 parts of concentrated HCl and the nitrite excess is destroyed with sulfamic acid.

A solution of 32 parts of H acid in 320 parts of water is added to a solution of 28 parts of 4-(2-sulfatoethylsulfonyl) aniline, diazotized according to Example 1, and the pH is kept constant at 2 by addition of sodium hydroxide solution. The solution of the coupling product is then added to the previously prepared diazo solution, the pH is increased to 7.5 and the mixture is stirred for one hour. The dye solution is then freed from salts by dialysis and evaporated. The compound of the formula
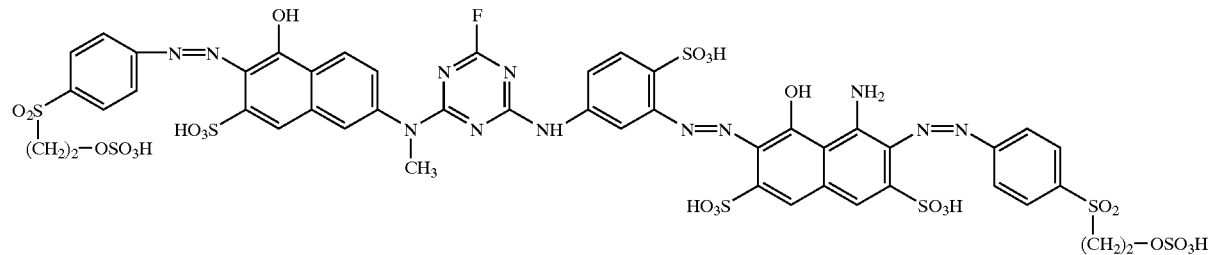
results as a dark powder which dyes cellulose in a black shade with good allround properties.
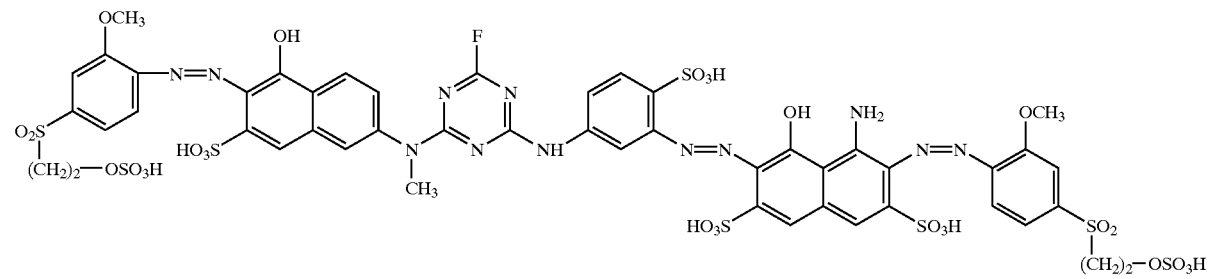
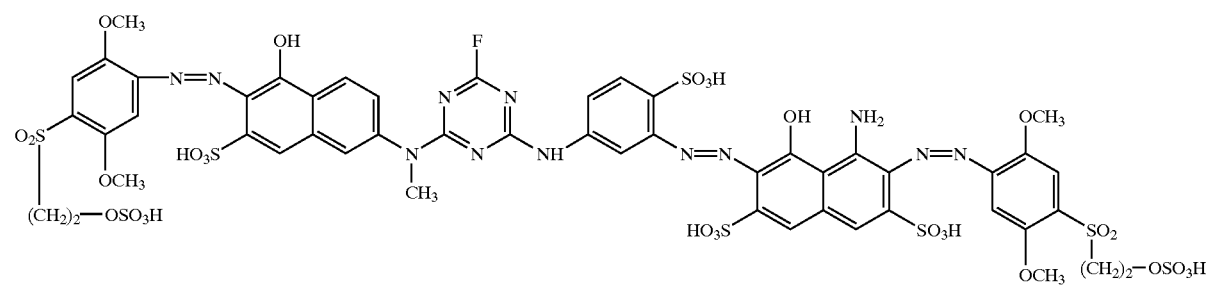
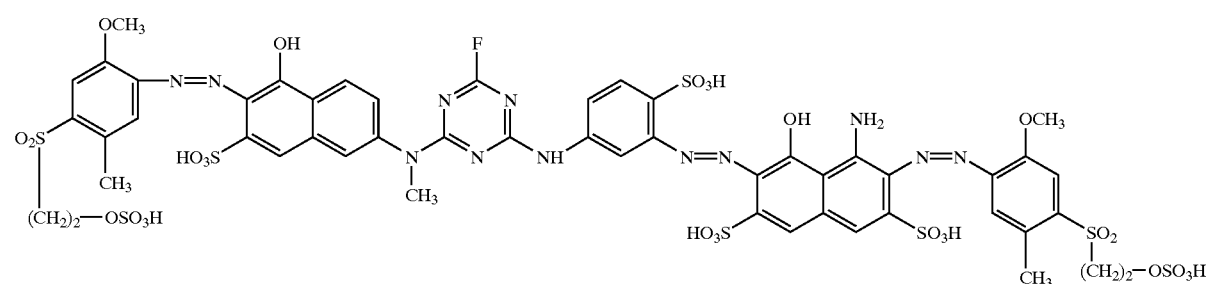
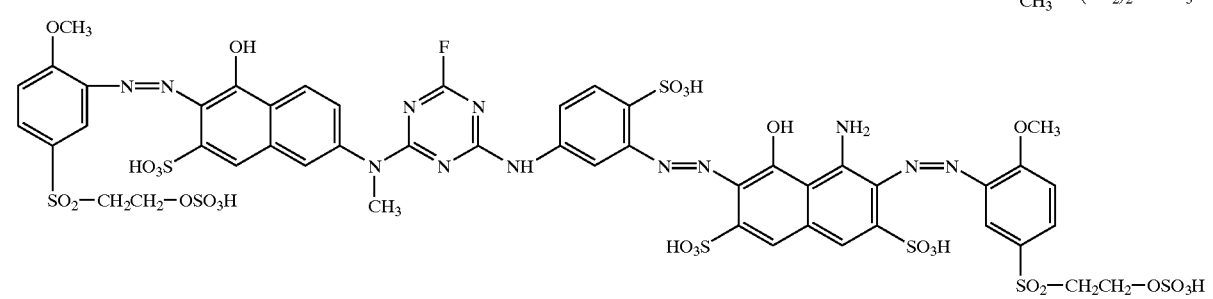

can be obtained in a manner analogous to that described in Example 267.

EXAMPLES 268 to 271

The compounds of the formula

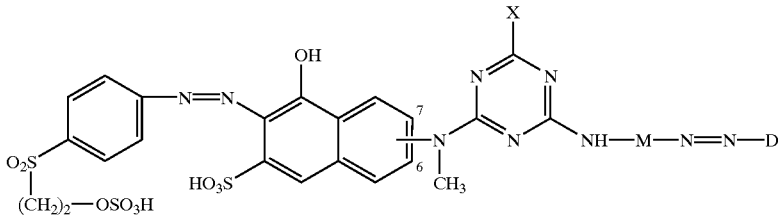

in which D, M and X are as defined in the following Table 19 and the group —N(CH$_3$)— has the linkage position stated, can be obtained by a procedure analogous to that described in Example 267.

TABLE 19

| | | | | |
|---|---|---|---|---|
| 268 | 6 | F | 1-Hydroxy-7-(4-[2-Sulfato-ethylsulfonyl]phenylazo)-3,5-disulfo-8-amino-2-naphthyl | 1-Sulfo-2,4-phenylene |
| 269 | 7 | F | 1-Hydroxy-7-(4-[2-Sulfato-ethylsulfonyl]phenylazo)-3,6-disulfo-8-amino-2-naphthyl | 1-Sulfo-2,4-phenylene |
| 270 | 7 | F | 1-Hydroxy-7-(4-[2-Sulfato-ethylsulfonyl]phenylazo)-3,5-disulfo-8-amino-2-naphthyl | 1-Sulfo-2,4-phenylene |
| 271 | 6 | F | 1-Hydroxy-7-(4-[2-Sulfato-ethylsulfonyl]phenylazo)-3,6-disulfo-8-amino-2-naphthyl | 1,3-Disulfo-4,6-phenylene |

EXAMPLE 272

A neutral solution of 32 parts of H acid in 320 parts of water is added dropwise at 0° C. to the reaction solution of 28 parts of 4-(2-sulfatoethylsulfonyl)aniline, diazotized according to Example 1, and the pH is kept constant at 2.5 by addition of sodium hydroxide solution until coupling is complete.

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid.

The two reaction solutions prepared above are combined, the pH is increased to 7.5 and the mixture is stirred for one hour (reaction solution 1).

25 parts of finely powdered N-methyl-I acid are sprinkled into the solution of 20 parts of 2-amino-4-methoxybenzenesulfonic acid, diazotized in a manner analogous to that described in Example 1, and the pH is slowly raised to 7 with sodium hydroxide solution. When the coupling has ended, reaction solution 1 prepared above is added dropwise and the pH is kept constant at 7 by addition of sodium hydroxide solution. The dye solution is then freed from salts by dialysis and evaporated. The compound of the formula

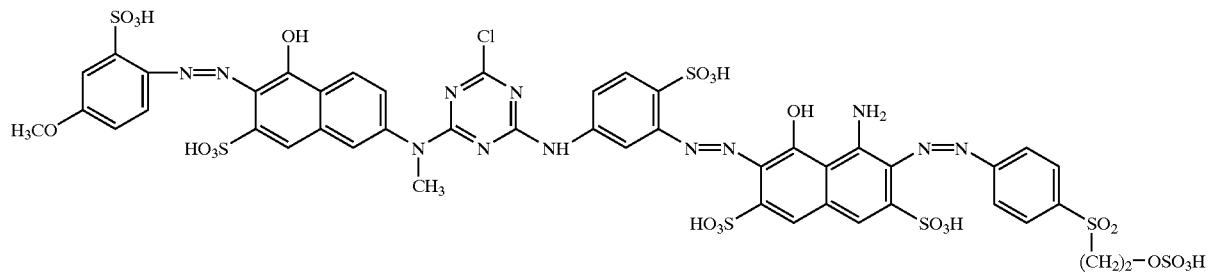

results as a dark powder which dyes cellulose in a black shade with good allround properties.

The dyes of the formula

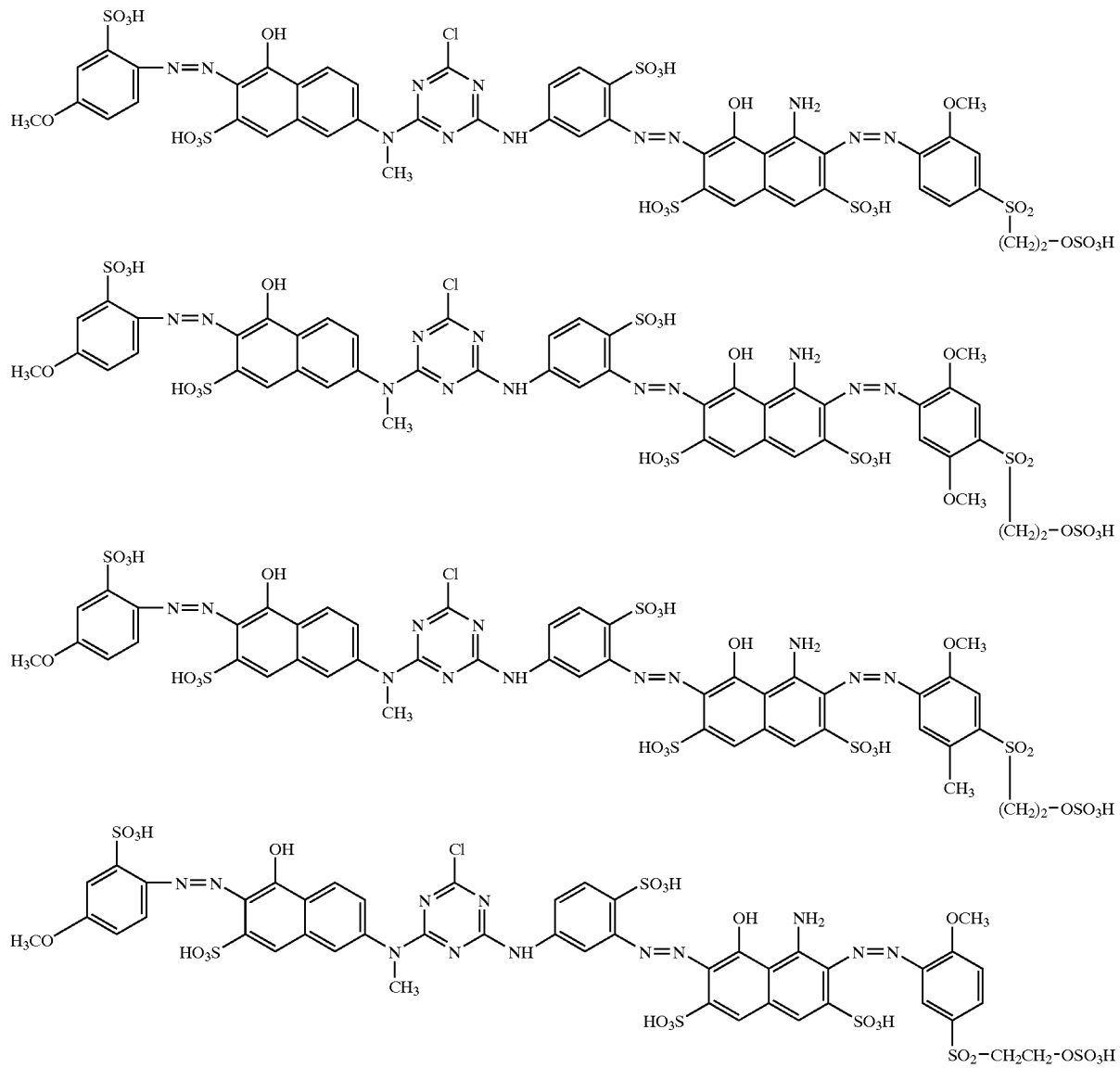

can be obtained in a manner analogous to that described in Example 272.

EXAMPLES 273 to 277

The compounds of the formula

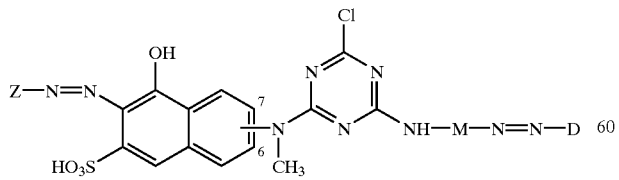

in which D, M and Z are as defined in the following Table 20 and the group —N(CH$_3$)— has the linkage position stated therein, can be prepared by a procedure analogous to that described in Example 272.

TABLE 20

| Example No. | Position of —N(CH$_3$) on the naphthyl ring | Z | D | M |
|---|---|---|---|---|
| 273 | 6 | 4-Methoxy-2-sulfo-phenyl | 1-Hydroxy-7-(4-[2-Sulfatoethyl-sulfonyl]phenyl-azo)-3,5-disulfo-8-amino-2-naphthyl | 1-Sulfo-2,4-phenylene |
| 274 | 7 | 4-Methoxy-2-sulfo-phenyl | 1-Hydroxy-7-(4-[2-Sulfatoethyl-sulfonyl]phenyl-azo)-3,6-disulfo-8-amino-2-naphthyl | 1-Sulfo-2,4-phenylene |

TABLE 20-continued

| Example No. | Position of —N(CH₃) on the naphthyl ring Z | Z | D | M |
|---|---|---|---|---|
| 275 | 7 | 4-Methoxy-2-sulfo-phenyl | 1-Hydroxy-7-(4-[2-Sulfatoethyl-sulfonyl]phenyl-azo)-3,5-disulfo-8-amino-2-naphthyl | 1-Sulfo-2,4-phenylene |
| 276 | 6 | 4-Methoxy-2-sulfo-phenyl | 1-Hydroxy-7-(4-[2-Sulfatoethyl-sulfonyl]phenyl-azo)-3,6-disulfo-8-amino-2-naphthyl | 1,3-Disulfo-4,6-phenylene |
| 277 | 6 | 1-Sulfo-2-naphthyl | 1-Hydroxy-7-(4-[2-Sulfatoethyl-sulfonyl]phenyl-azo)-3,6-disulfo-8-amino-2-naphthyl | 1,3-Disulfo-4,6-phenylene |

EXAMPLE 278

14 parts of cyanuric fluoride are added dropwise to a cold solution of 19 parts of 2,4-diaminobenzenesulfonic acid in 190 parts of water at pH 5 and the pH is kept constant by addition of sodium hydroxide solution until the condensation reaction has ended (reaction solution 2).

25 parts of finely powdered N-methyl-I acid are sprinkled into the solution of 20 parts of 2-amino-4-methoxybenzenesulfonic acid diazotized in a manner analogous to that described in Example 1, and the pH is raised slowly to 7 with sodium hydroxide solution. The solution of the coupling product is added dropwise to reaction solution 2 prepared above and the pH is kept constant at 7 by addition of sodium hydroxide solution. Thereafter, the product is rediazotized with 9 parts of sodium nitrite at 25 parts of concentrated HCl (reaction solution 3).

A solution of 32 parts of H acid in 320 parts of water is added to a solution of 28 parts of 4-(2-sulfatoethylsulfonyl) aniline, diazotized according to Example 1, and the pH is kept constant at 2 by addition of sodium hydroxide solution. The solution of the coupling product is then added to reaction solution 3 prepared previously, the pH is increased to 7.5 and the mixture is stirred for one hour. The dye solution is then freed from salts by dialysis and evaporated. The compound of the formula

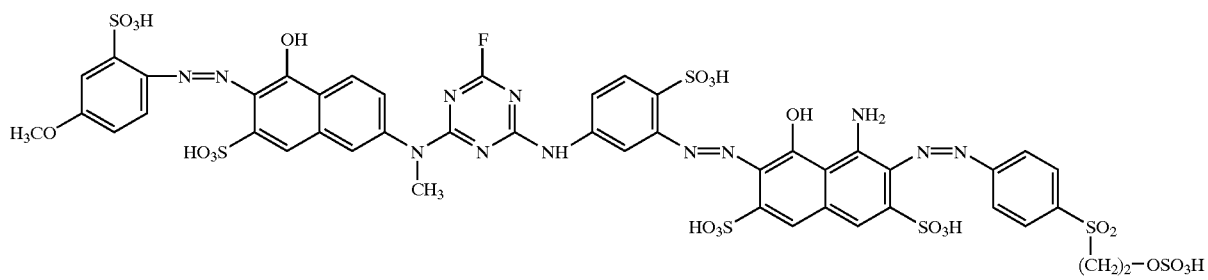

results as a dark powder which dyes cellulose in a black shade with good allround properties.

EXAMPLES 279 to 283

The compounds of the formula

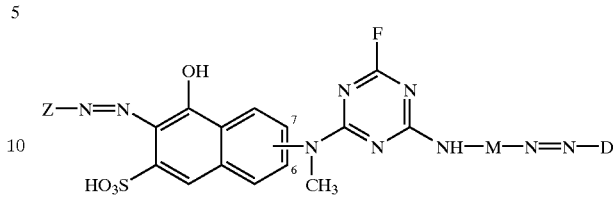

in which D, M and Z are as defined in the following Table 21 and the group —N(CH₃)— has the linkage position stated therein, can be prepared in a manner analogous to that described in Example 278.

TABLE 21

| Example No. | Position of N(CH₃) on the naphthyl ring Z | Z | D | M |
|---|---|---|---|---|
| 279 | 4 | 4-Methoxy-2-sulfo-phenyl | 1-Hydroxy-7-(4-[2-Sulfa-toethylsulfonyl]phenylazo)-3,5-disulfo-8-amino-2-naphthyl | 1-Sulfo-2,4-phenyl-ene |
| 280 | 7 | 4-Methoxy-2-sulfo-phenyl | 1-Hydroxy-7-(4-[2-Sulfa-toethylsulfonyl]phenylazo)-3,6-disulfo-8-amino-2-naphthyl | 1-Sulfo-2,4-phenyl-ene |
| 281 | 7 | 4-Methoxy-2-sulfo-phenyl | 1-Hydroxy-7-(4-[2-Sulfa-toethylsulfonyl]phenylazo)-3,5-disulfo-8-amino-2-naphthyl | 1-Sulfo-2,4-phenyl-ene |
| 282 | 6 | 4-Methoxy-2-sulfo-phenyl | 1-Hydroxy-7-(4-[2-Sulfa-toethylsulfonyl]phenylazo)-3,6-disulfo-8-amino-2-naphthyl | 1,3-Disulfo-4,6-phenyl-ene |
| 283 | 6 | 1-Sulfo-2-naphthyl | 1-Hydroxy-7-(4-[2-Sulfa-toethylsulfonyl]phenylazo)-3,6-disulfo-8-amino-2-naphthyl | 1,3-Disulfo-4,6-phenyl-ene |

EXAMPLE 284

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid. 32 parts of finely powdered H acid are introduced into the cold solution, which is acid to Congo Red, of the diazo component and the pH is brought to 2.5 with sodium hydroxide solution and kept constant at this value until the coupling has ended. Thereafter, a neutral solution of 25 parts of N-methyl-I acid in 250 parts of water is added dropwise and the pH is increased to 7 and kept constant at this value until the condensation has ended. The condensation product is added to the solution, prepared according to Example 1, of diazo component 1 and the pH is increased to 6.5 and kept at this value during the subsequent coupling. Thereafter, the resulting dye solution is freed from inorganic salts by dialysis and evaporated, the compound according to Example 236 resulting in a comparable yield and quality.

The compounds according to Examples 251–254 and 261 to 265 can also be prepared in an analogous manner.

EXAMPLE 285

14 parts of cyanuric fluoride are added dropwise to a cold solution of 19 parts of 2,4-diaminobenzenesulfonic acid in 190 parts of water at pH 5 and the pH is kept constant by addition of sodium hydroxide solution until the condensation reaction has ended. Thereafter, a neutral solution of 25 parts of N-methyl-I acid in 250 parts of water is added and the pH is increased to 7 and kept constant at this value by addition of sodium hydroxide solution until the condensation reaction has ended. The reaction solution is then added to a solution of 28 parts of 4-(2-sulfatoethylsulfonyl)aniline, diazotized according to Example 1, and the pH is increased to 7 and kept at this value during the subsequent coupling. Thereafter, the product is rediazotized by addition of 9 parts of sodium nitrite and 25 parts of concentrated HCl and the nitrite excess is destroyed with sulfamic acid. 32 parts of H acid are introduced and the pH is increased to 2.6 with sodium hydroxide solution and kept at this value until the coupling has ended. Thereafter, a solution of 28 parts of 4-(2-sulfatoethylsulfonyl)aniline, diazotized according to Example 1, is added and the pH is increased to 7 and kept at this value until this coupling has ended. The dye solution is then freed from salts by dialysis and evaporated. The compound according to Example 267 results in a comparable yield and quality.

The compounds according to Examples 268 to 271 can be also be prepared in an analogous manner.

EXAMPLE 286

25 parts of finely powdered N-methyl-I acid are sprinkled into the solution of 20 parts of 2-amino-4-methoxybenzenesulfonic acid, diazotized in a manner analogous to that described in Example 1, and the pH is raised slowly to 7 with sodium hydroxide solution and kept at this value until the coupling has ended (reaction solution 4).

18 parts of cyanuric chloride are suspended in 45 parts of ice/water at a temperature of 0° C. and the suspension is buffered with phosphate buffer. A neutral solution of 19 parts of 2,4-diaminobenzenesulfonic acid in 190 parts of water is added dropwise and the pH is kept constant at 5 by addition of sodium hydroxide solution. When the condensation reaction has ended, 9 parts of sodium nitrite and 25 parts of concentrated HCl are added at 0° C., the mixture is stirred at this temperature for one hour and the excess nitrite is then destroyed with sulfamic acid. 32 parts of finely powdered H acid are introduced into the cold solution, which is acid to Congo Red, of the diazo component and the pH is brought to 2.5 with sodium hydroxide solution and kept constant at this value until the coupling has ended. The resulting reaction solution is added dropwise to reaction solution 4 prepared previously and the pH is kept constant by addition of sodium hydroxide solution. The resulting solution is reacted with half the amount of diazo solution 1, prepared according to Example 1, the compound according to Example 272 resulting in a comparable yield and quality.

The compounds according to Examples 273 to 277 can be prepared in an analogous manner.

EXAMPLE 287

14 parts of cyanuric fluoride are added dropwise to a cold solution of 19 parts of 2,4-diaminobenzenesulfonic acid in 190 parts of water at pH 5 and the pH is kept constant by addition of sodium hydroxide solution until the condensation reaction has ended (reaction solution 2).

25 parts of finely powdered N-methyl-I acid are sprinkled into the solution of 20 parts of 2-amino-4-methoxybenzenesulfonic acid, diazotized in a manner analogous to that described in Example 1, and the pH is slowly raised to 7 with sodium hydroxide solution. The solution of the coupling product is added dropwise to reaction solution 2 prepared above and the pH is kept constant at 7 by addition of sodium hydroxide solution. Thereafter, the product is rediazotized with 9 parts of sodium nitrite and 25 parts of concentrated HCl and coupled with 32 parts of H acid at pH 2.7. After further coupling with half of diazo solution 1, prepared according to Example 1, the dye according to Example 278 is obtained in a comparable yield and quality.

The compounds according to Examples 279 to 283 can be prepared in an analogous manner.

EXAMPLE 288

18 parts of cyanuric chloride are suspended in 45 parts of ice/water at 0° C. and a neutral solution of 25 parts of N-methyl-I acid in 250 parts of water is added dropwise at pH 7. After the condensation reaction, the solution is poured into half the amount of diazo solution 1, prepared according to Example 1, and the pH is increased slowly to 7. When no further diazo compound is detectable, 19 parts of 2,4-diaminobenzenesulfonic acid in 190 parts of water are added and the pH is maintained again. Thereafter, the product is diazotized with 9 parts of sodium nitrite and 25 parts of concentrated HCl and the mixture is stirred for one hour. After introduction of 32 parts of H acid, the pH is brought to and kept at pH 2.6 with sodium hydroxide solution. When the coupling has ended, the mixture is topped up with 20 parts of 2-amino-4-methoxybenzenesulfonic acid, diazotized in a manner analogous to that described in Example 1, and the pH is brought slowly to 6.5. After removal of salts and evaporation, the dye according to Example 255 results in a comparable yield and quality.

The compounds according to Examples 256 to 260 can be prepared in an analogous manner.

Dyeing Instructions I 2 parts of the dye obtained according to Example 1 are dissolved in 400 parts of water, and 1500 parts of a solution comprising 53 g of sodium chloride per liter are added. 100 parts of cotton fabric are introduced into this dyebath at 40° C. After 45 minutes, 100 parts of a solution comprising 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a nonionic detergent for a quarter of an hour, rinsed again and dried.

Dyeing Instructions II 2 parts of the reactive dye obtained according to Example 1 are dissolved in 400 parts of water, and 1500 parts of a solution comprising 53 g of sodium chloride per liter are added. 100 parts of a cotton fabric are introduced into this dyebath at 35° C. After 20 minutes, 100 parts of a solution comprising 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing Instructions III 8 parts of the reactive dye obtained according to Example 1 are dissolved in 400 parts of water, and 1400 parts of a solution comprising 100 g of sodium sulfate per liter are added. 100 parts of a cotton fabric are introduced into this dyebath at 25° C. After 10 minutes, 200 parts of a solution comprising 150 g of trisodium phosphate per liter are added. Thereafter, the temperature of the dyebath is increased to 60° C. in the course of 10 minutes. The temperature is kept at 60° C. for a further 90 minutes. Thereafter, the goods are rinsed, soaped at the boil with a nonionic detergent for a quarter of an hour, rinsed again and dried.

Dyeing Instructions IV 4 parts of the reactive dye obtained according to Example 1 are dissolved in 50 parts of water. 50 parts of a solution comprising 5 g of sodium hydroxide and 20 g of calcined sodium carbonate per liter are added. A cotton fabric is padded with the resulting solution such that it increases by 70% of its weight, and is then wound up on a roll. The cotton fabric is kept in this manner at room temperature for 3 hours. Thereafter, the dyed goods are rinsed, soaped at the boil with a nonionic detergent for a quarter of an hour, rinsed again and dried.

Dyeing Instructions V 6 parts of the reactive dye obtained according to Example 1 are dissolved in 50 parts of water. 50 parts of a solution comprising 16 g of sodium hydroxide and 0.04 liter of water-glass (38° bé) per liter are added. A cotton fabric is padded with the resulting solution such that it increases by 70% of its weight, and is then wound up on a roll. The cotton fabric is kept in this manner at room temperature for 10 hours. Thereafter, the dyed goods are rinsed, soaped at the boil with a nonionic detergent for a quarter of an hour, rinsed again and dried.

Dyeing Instructions VI 2 parts of the reactive dye obtained according to Example 1 are dissolved in 100 parts of water with addition of 0.5 part of sodium m-nitrobenzenesulfonate. A cotton fabric is impregnated with the resulting solution such that it increases by 75% of its weight and is then dried. The fabric is then impregnated with a solution, warmed to 20° C., comprising 4 g of sodium hydroxide and 300 g of sodium chloride per liter and squeezed off to a weight increase of 75% and the dyeing is steamed at 100 to 102° C. for 30 seconds, rinsed, soaped in a 0.3% boiling solution of a nonionic detergent for a quarter of an hour, rinsed and dried.

Dyeing Instructions VII 0.1 part of dye according to Example 1 is dissolved in 200 parts of demineralized water, and 0.5 part of Glauber's salt, 0.1 part of a levelling agent and 0.5 part of sodium acetate are added. The pH is then brought to 5 with 80% acetic acid. The dyebath is heated to 50° C. in the course of 10 minutes and 10 parts of a woollen fabric are then added. The bath is heated to 100° C. in the course of about 50 minutes and dyeing is carried out at this temperature for 60 minutes. Thereafter, the bath is allowed to cool to 90° C. and the dyed goods are removed. The woollen fabric is rinsed with hot and cold water and then spun and dried. A brilliant dyeing which has very good light and wet fastness properties is obtained.

Printing Instructions I 3 parts of the reactive dye obtained according to Example 1 are sprinkled, while stirring rapidly, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the resulting printed material is steamed in saturated steam at 102° C. for two minutes. The printed fabric is then rinsed, soaped at the boil, if appropriate, and rinsed again, and then dried.

Printing Instructions II 5 parts of the reactive dye obtained according to Example 1 are sprinkled, while stirring rapidly, into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the printing paste thus obtained, the stability of which meets industrial requirements, and dried and the resulting printed material is steamed in saturated steam at 102° C. for 8 minutes. The printed fabric is then rinsed, soaped at the boil, if appropriate, and rinsed again, and then dried.

What is claimed is:

1. A compound of the formula

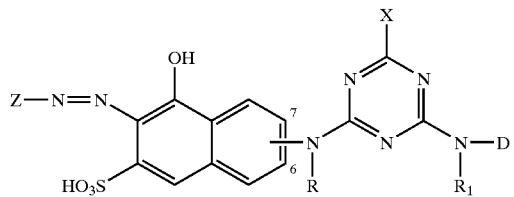

(1), in which

R is substituted or unsubstituted $C_1$–$C_4$alkyl, $R_1$ is hydrogen,

X is halogen,

Z is phenyl which is substituted by one or more identical or different substituents from the group consisting of sulfo, $C_1$–$C_4$alkyl, $C_1$–$C_4$alkoxy and reactive radicals of the formulae $$-SO_2-Y \qquad (2a),$$

$$-CONH-(CH_2)_n-SO_2-Y \qquad (2b),$$

$$-NH-CO-Y_1 \qquad (2d),$$

in which

Y is vinyl, β-chloroethyl, β-sulfatoethyl, β-thiosulfatoethyl, β-acetoxyethyl, β-phenoxyethyl or β-phosphatoethyl, $Y_1$ is a group $-CHX_1-CH_2X_1$ or $-CX_1=CH_2$ and $X_1$ is bromine or chlorine, and n is an integer from 1 to 6; or Z is 1- or 2-naphthyl which is substituted by sulfo or a reactive radical of the formula (2a) defined above; and D is the radical of formula

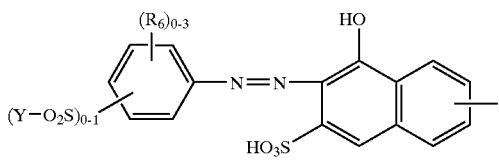
(5a), in which $(R_6)_{0-3}$ is 0 to 3 identical or different substituents from the group consisting of $C_1$–$C_4$alkyl, $C_1$–$C_4$alkoxy, halogen, carboxyl and sulfo and Y is as defined above;

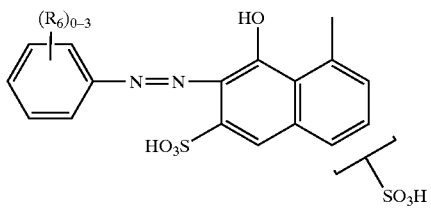
(5b), in which $(R_6)_{0-3}$ is as defined above or is a radical of the formula —$SO_2$—Y,
in which Y is as defined above;

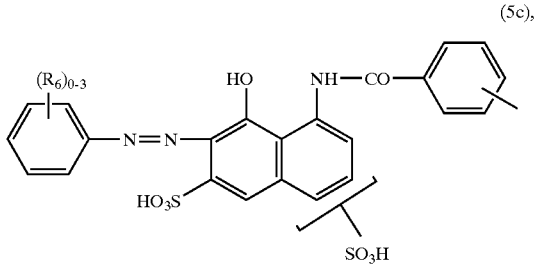
(5c), in which $(R_6)_{0-3}$ is as defined above,

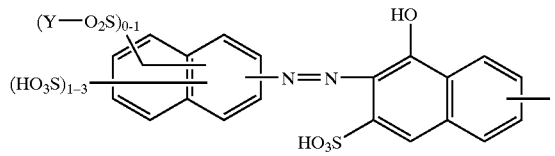
(5d), in which Y is as defined above;

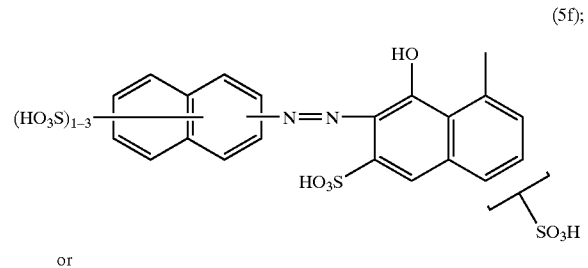
(5f);

or

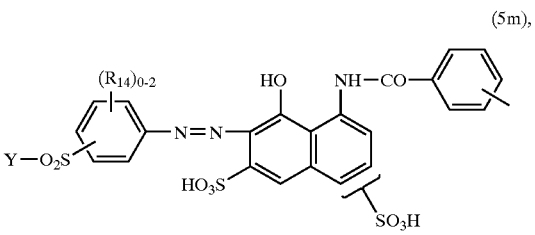
(5m), in which $(R_{14})_{0-2}$ is 0 to 2 identical or different substituents from the group consisting of $C_1$–$C_4$alkyl, $C_1$–$C_4$alkoxy, halogen, carboxyl and sulfo; and Y is as defined above;

with the proviso that at least one of the radicals D and Z carries a fibre-reactive radical —$SO_2$—Y or —NHCO—$Y_1$, in which Y and $Y_1$ are as defined above.

2. A compound according to claim 1, in which R is $C_1$–$C_4$alkyl.

3. A compound according to claim 1, in which X is fluorine or chlorine.

4. A compound according to claim 1, in which

Z is (i) phenyl which is unsubstituted or substituted by sulfo, methyl, methoxy or a reactive radical —$SO_2$-Y, in which Y is vinyl or β-sulfatoethyl, or (ii) 2-naphthyl which is substituted by 1 to 3 sulfo groups.

5. A process for dyeing or printing a fibre material containing hydroxyl groups or containing nitrogen, which process comprises the step of applying to said fibre material a tinctorial amount of a compound of the formula (1) according to claim 1.

\* \* \* \* \*